(12) United States Patent
Mehrl et al.

(10) Patent No.: US 7,095,494 B2
(45) Date of Patent: Aug. 22, 2006

(54) METHOD AND APPARATUS FOR MEASURING TEMPORAL RESPONSE CHARACTERISTICS OF DIGITAL MIRROR DEVICES

(75) Inventors: David Joseph Mehrl, Plano, TX (US); Kun Cindy Pan, Allen, TX (US); Mark Henry Strumpell, Plano, TX (US); Rand Derek Carr, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 280 days.

(21) Appl. No.: 10/230,756

(22) Filed: Aug. 29, 2002

(65) Prior Publication Data

US 2004/0042000 A1 Mar. 4, 2004

(51) Int. Cl.
*G01B 9/00* (2006.01)
*G01B 11/26* (2006.01)
*G01N 21/55* (2006.01)

(52) U.S. Cl. .................. 356/124; 356/128; 356/139.1; 356/445

(58) Field of Classification Search ............... 356/310, 356/138, 139.02, 139.1, 140, 154, 614, 615, 356/620, 124, 124.5, 239.1–239.3, 239.7–239.8, 356/237.1–237.5, 445–448, 640; 398/129, 398/131, 156; 359/846, 848, 849, 267, 318, 359/290–292, 302, 315, 850, 851, 298, 855, 359/197–199
See application file for complete search history.

(56) References Cited

U.S. PATENT DOCUMENTS 3,617,755 A * 11/1971 Arnaud ..................... 250/233

| | | | |
|---|---|---|---|
| 5,796,508 A | * | 8/1998 | Suzuki ..................... 359/224 |
| 6,744,550 B1 | * | 6/2004 | Neukermans et al. ....... 359/291 |
| 6,775,047 B1 | * | 8/2004 | Leung et al. ............... 359/290 |

(Continued)

OTHER PUBLICATIONS

U.S. Appl. No. 10/160,377, filed May 31, 2002, Mehrl et al.

*Primary Examiner*—Gregory J. Toatley, Jr.
*Assistant Examiner*—Gordon J. Stock, Jr.
(74) *Attorney, Agent, or Firm*—Charles A. Brill; Wade James Brady, III; Frederick J. Telecky, Jr.

(57) ABSTRACT

A method and system for measuring the temporal response of a micromirror array to a variety of driving signals. A micromirror array is illuminated with a coherent light source so that a diffraction pattern is reflected from the micromirror array. One or more photodetectors are aligned with spots of light in the diffraction pattern that correspond to orders of the diffraction pattern. Diffraction pattern theory predicts that the intensity of these spots of light will vary as the tilt angle of the micromirrors is changed. Thus, by measuring the relative intensity of the spots of light as the micromirror array is provided with a variety of driving signals, many performance characteristics of the micromirror array can be measured. Some of these characteristics include the impulse response, the forced resonant frequency (i.e. the natural frequency), the damped resonant frequency, the quality factor of the micromirror response, the damping factor of the micromirror response, and the frequency transfer function. According to another aspect of the invention, the electromechanical compliance of the micromirrors in the micromirror array can also be measured. It is further contemplated that all of these measurements can be localized to specific regions on the surface of the micromirror array so that the variance of different characteristics across its surface can be analyzed. Another aspect of the disclosed invention is the measurement of the tilt angle of the micromirror array at a non-biased state.

23 Claims, 12 Drawing Sheets

U.S. PATENT DOCUMENTS

| | | |
|---|---|---|
| 6,788,416 B1 * | 9/2004 | Reuter ........................ 356/445 |
| 6,831,750 B1 * | 12/2004 | Mehrl et al. ................. 356/614 |
| 2002/0079432 A1 * | 6/2002 | Lee et al. .................... 250/216 |
| 2002/0106144 A1 * | 8/2002 | Garverick et al. ............ 385/18 |
| 2003/0220749 A1 * | 11/2003 | Chen et al. ................... 702/31 |

\* cited by examiner

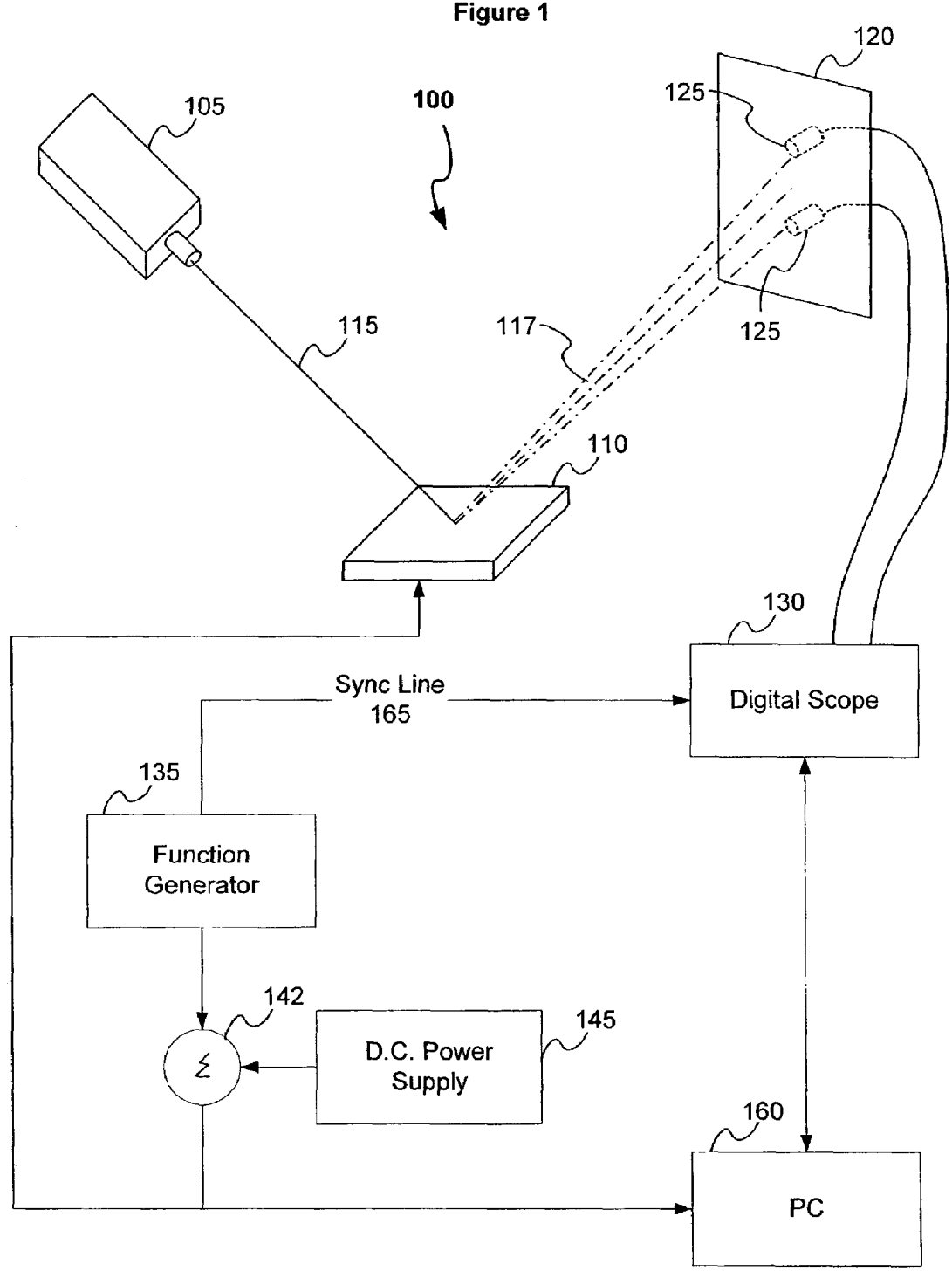

Impulse Response of DMD with Residual Tilt

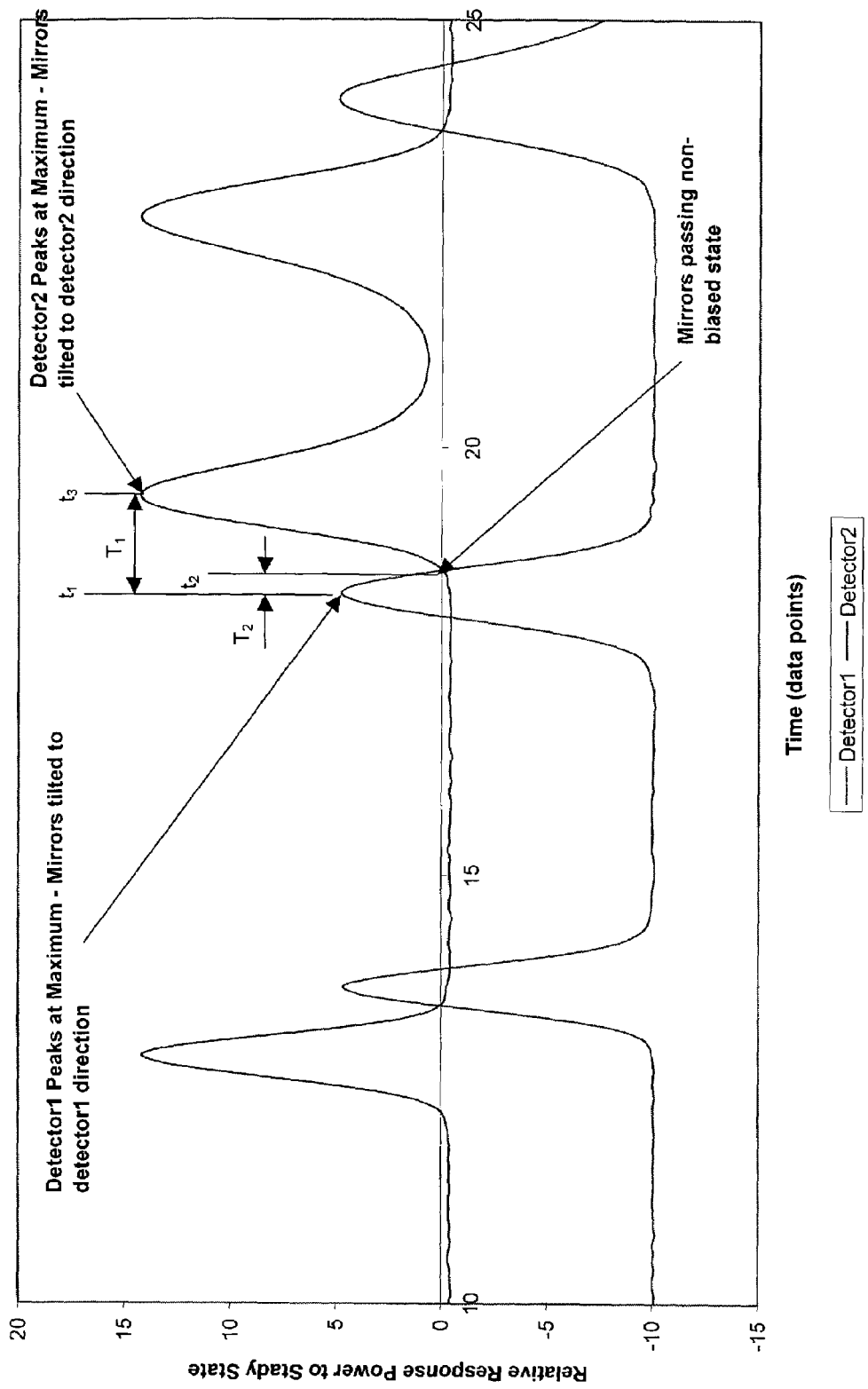

(a.) DMD Array geometry (b.) Diffraction pattern geometry and definition of diffraction order indices

METHOD AND APPARATUS FOR MEASURING TEMPORAL RESPONSE CHARACTERISTICS OF DIGITAL MIRROR DEVICES

CROSS REFERENCE TO RELATED APPLICATION(S)

This application is related to U.S. patent application Ser. No. 10/160,377 entitled "Method and Apparatus for Using Spatial Patterns for Measuring Mirror Tilt Angles in Digital Mirror Devices," which has a filing date of May 31, 2002.

BACKGROUND

Micromechanical devices are small structures typically fabricated on a semiconductor wafer using techniques such as optical lithography, metal sputtering, plasma oxide deposition, and plasma etching that have been developed for the fabrication of integrated circuits. Digital micromirror devices (DMDs), sometimes referred to as deformable mirror devices, are a type of micromechanical device. Other types of micromechanical devices include accelerometers, pressure and flow sensors, gears and motors. Digital micromirror devices are primarily used in optical display systems. In display systems, the DMD is a light modulator that uses digital image data to modulate a beam of light by selectively reflecting portions of the beam of light to a display screen. While analog modes of operation are possible, DMDs are often operated in a digital bistable mode of operation and as such are the core of true digital full-color image projection systems.

Many different kinds of micromirror devices exist, including torsion beam devices, and hidden-hinge devices. All micromirror devices, however, are usually operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a pixel on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion hinge axis. Digital operation uses a relatively large address voltage to ensure the mirror is fully deflected. The address electrodes are driven using standard logic voltage levels and a bias voltage, typically a positive voltage, is applied to the mirror metal layer to control the voltage difference between the address electrodes and the mirrors. Use of a sufficiently large mirror bias voltage, a voltage above what is termed the threshold voltage of the device, ensures the mirror will fully deflect toward the address electrode—even in the absence of an address voltage. The use of a large mirror bias voltage enables the use of low address voltages since the address voltages need only slightly deflect the mirror prior to the application of the large mirror bias voltage.

To create an image using the micromirror device, the light source is positioned at an angle relative to the device normal that is twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror rapidly is rotated on and off to vary the quantity of light reaching the image plane. The human eye integrates the light pulses and the brain perceives a flicker-free intermediate brightness level.

As can be appreciated, the temporal response of micromirrors in the micromirror array to input signals is an important metric of the performance of the micromirrors. Indeed, the temporal response characteristics can be used to determine if the micromirrors are operating properly or improperly. More specifically, the temporal response characteristics can detect manufacturing defects in the micromirrors at a macroscopic scale. The characteristics can also measure imperfections and performance variations across the surface of a micromirror array.

Existing systems for measuring the temporal response of micromirror arrays utilize devices that measure the performance of individual micromirrors in the micromirror array. For example, one method for measuring the temporal response of a micromirror uses a micromirror device characterization unit (MMDCU) or Nanospec measuring tool. These measurement tools have significant drawbacks though. In particular, the tools are expensive, highly sensitive, and require precise alignment with the micromirror array in order to produce accurate measurements. Furthermore, these tools can only measure one mirror at a time, thus producing measurement that have a relatively low signal to noise ratio.

Accordingly, there is a need in the art for a relatively simple and inexpensive method and apparatus for measuring the temporal response characteristics of a micromirror array. There is also a need in the art for a measuring device and method that can simultaneously measure the temporal response of a plurality of micromirrors thereby increasing the signal to noise ratio, and rendering a statistical ensemble-averaged response. There is also a need for a measuring device and method that can measure the temporal response of micromirrors without using sensitive microscopic and micro-positioning equipment.

BRIEF SUMMARY

An improved method and apparatus for performing temporal measurements of the response characteristics of a micromirror array are disclosed in this application. The system utilizes a coherent light source, such as a laser, to illuminate a portion of a micromirror array so that a diffraction pattern is reflected by the micromirror array onto a reflection screen. Diffraction pattern theory dictates that as the micromirrors of the micromirror array are tilted to new angles in unison, the intensity, but not the location, of the spots of the diffraction pattern will change. Photodetectors can therefore be aligned with certain spots in the diffraction pattern so that the intensity of these spots can be accurately measured as the micromirrors are tilted to different angles in unison. In order to perform accurate measurements of the temporal response of the mirrors to various stimuli, a system may be connected to the micromirror array and to the photodetectors to drive the micromirror array with input signals and measure its response characteristics.

According to one aspect of the invention, a DC power supply applies a bias voltage to the micromirror array so that the micromirrors are tilted at an angle (i.e. an operating point) that will produce a large response when they are simultaneously excited by a relatively small AC driving signal. According to another aspect, a variety of driving signals can be applied to the micromirror array, including, for example, a periodic sinusoidal waveform, a square wave signal, an impulse (i.e. Dirac function) signal, and a frequency swept periodic waveform. By using these different waveforms, a variety of characteristics of the micromirror array can be measured, such as the impulse response, the forced resonant frequency (i.e. the natural frequency), the damped resonant frequency, the quality factor of the micromirror response, the damping factor of the response, the frequency transfer function, and the non-biased tilt angle of the micromirror array. According to another embodiment, the electromechanical compliance of the micromirrors in the micromirror array can also be measured. Another aspect of the disclosed invention is the measurement of the tilt angle of the micromirror array at a non-biased state. It is further contemplated that all of these measurements can be localized to specific regions on the surface of the micromirror array so that the variance of different parameters across its surface can be analyzed.

BRIEF DESCRIPTION OF THE DRAWINGS

FIG. 1 is block diagram of one embodiment of a temporal measurement system suitable for use with the disclosed method and apparatus.

FIG. 8A is a chart depicting a close-up view of a portion of the response of a micromirror array after the micromirrors have been released from their respective landing positions.

DETAILED DESCRIPTION

Figure 1A:
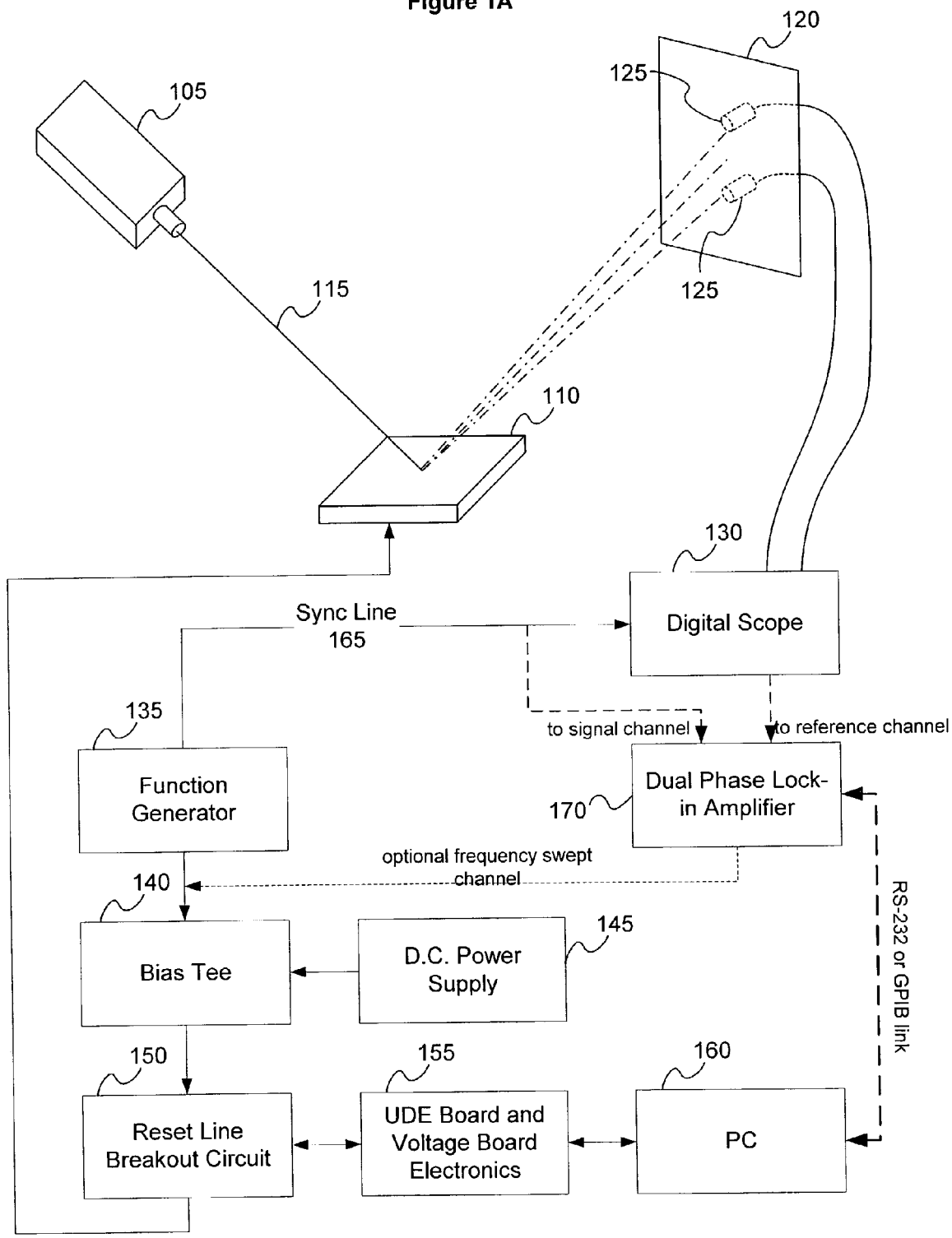
FIG. 1A is block diagram of another embodiment of a temporal measurement system suitable for use with the disclosed method and apparatus.

Micromirrors, like any other mechanical system, can be modeled using second order differential equations. For example, the transient response of a mechanical mass-spring-damper system can be modeled using the following equation:

$$M\frac{\partial^2 y(t)}{\partial t^2} + B\frac{\partial y(t)}{\partial t} + Ky(t) = f(t) \tag{1.1}$$

wherein f(t) is the applied force, M is the mass, B is the damping coefficient, K is the linear spring constant, and y(t) is the displacement of the system. Micromirrors, which have mass, spring-like mounts, and can have damping forces applied, can therefore be accurately modeled with equations similar to equation (1.1).

It is well known that second order differential equations can be readily converted into the frequency domain to facilitate analysis of the transient response of the system. The following equation (1.2) represents the Laplace transform of equation (1.1), which places equation (1.1) in the frequency domain:

$$G(s) = \frac{1}{s(Ms^2 + Bs + K)} \tag{1.2}$$

By applying well known mathematical theories to this equation, the natural frequency ($\omega_n$), and the damping factor ($\zeta$) of the mechanical system can be determined. Furthermore, by analyzing equation (1.2) in the frequency domain, other useful information can be determined, such as the poles and roots of the system. It should also be noted that these calculations can be performed in reverse; namely, by measuring the natural frequency ($\omega_n$) and the damping factor ($\zeta$) of the mechanical system, its poles, roots, mass, damping coefficient, and linear spring constant can be determined. In this manner, may useful characteristics of the micromirror array can be measured.

Theoretical Model for the Measurement System

Described below is the theoretical model for the temporal measurements conducted by the disclosed method and apparatus. The expression for the angular plane wave spectrum (similar to the far-field pattern) generated by a micromirror array when it is illuminated by a collimated laser beam with all mirrors landed in the same direction at tilt angle $\alpha$, takes the form:

$$\tilde{A}(\phi, \phi') \propto \pi(Wk_dT)^2 \tilde{A}_\phi(\phi)\tilde{A}_{\phi'}(\phi') \text{ where}: \tag{1.3}$$

$$\tilde{A}_\phi(\phi) = \sum_{m=-\infty}^{\infty} \text{sinc}\left[\frac{k_dT}{\lambda}(\phi + \sqrt{2}\sin\alpha)\right]\exp\left[-\left(\frac{\pi W}{\lambda}\right)^2\left(\phi - \frac{m\lambda}{T}\right)^2\right]$$

$$\tilde{A}_{\phi'}(\phi') = \sum_{n=-\infty}^{\infty} \text{sinc}\left[\frac{k_dT}{\lambda}(\phi' + \sqrt{2}\sin\alpha)\right]\exp\left[-\left(\frac{\pi W}{\lambda}\right)^2\left(\phi' - \frac{n\lambda}{T}\right)^2\right].$$

The derivation of these equations is described in further detail in the subsequent section entitled "The Mathematical Model of the Diffraction Pattern." These equations (1.3), which express the resulting angular plane wave spectrum of the far-field diffraction pattern, result from a wave optics analysis of the DMD array. Here, (m,n) are the diffraction order indices, W denotes the "waist" of the illuminating laser (assumed to have a Gaussian profile), φ and φ' denote the azimuthal and elevational angles respectively, α denotes the mirror tilt angle, $k_d$ denotes the "fill factor" of the mirrors, T denotes the mirror "pitch" (period from one mirror to the next adjacent mirror), and λ is the wavelength of the laser illumination. The "sinc" term arises from the rectangular mirror profile (recall that the Fourier transform of a "rect" function is a "sinc" function, where sinc(x)=sin(πx)/(πx)). The exponential (exp) Gaussian terms result from the assumption of Gaussian profiled laser illumination (recall that the Fourier transform of a Gaussian distribution is ALSO a Gaussian). Although this form assumes that the illuminating light is normally incident, it can be easily generalized to treat the case of oblique incidence. This form also ignores minor second order effects such as obliquity factors and geometric distortion factors (i.e. as a mirror tilts, the initially square profile of the mirror assumes an apparent slight "diamond-shape" aspect); but these effects are insignificant for the paraxial conditions associated with most DMDs where landed tilt angles are small, typically on the order of ±10°.

Figure 11A:
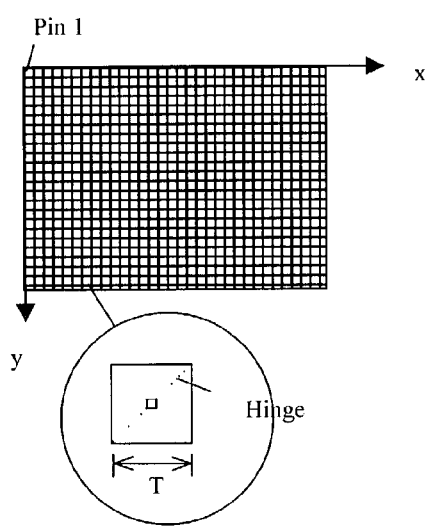
FIG. 11A is top-view of a portion of a representative micromirror array suitable for use with the disclosed invention.
Figure 11B:
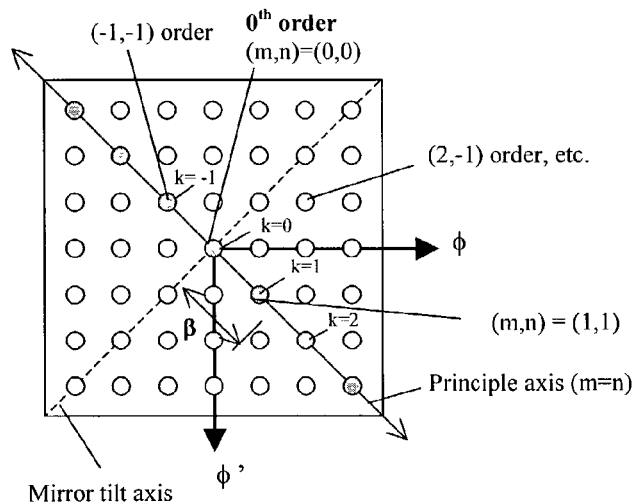
FIG. 11B is a representative view of the geometry and arrangement of the diffraction pattern generated by reflecting a laser beam from the surface of a micromirror array, such as the array depicted in FIG. 11A.

Now consider on-diagonal terms, i.e. the principal (brightest) orders lying along the line φ=φ', which also pertains to orders where m=n. These orders are depicted as gray-filled circles in FIG. 11B. These orders are sequentially blazed as the mirror pivots on its diagonal axis. If we let m=n, and let φ=φ'=β, equation (1.3) simplifies to:

Here the expression has been normalized, i.e. the $\pi(Wk_dT)^2$ term has been ignored, and only the non-cross-term products have been retained, replacing the indices i and $i_2$ above, with k=i=$i_2$. The symbol β indicates the on-diagonal angle (see FIG. 11B), and the (k=0) "zeroth" order is blazed when β=0° and √2 sin α=β, thus requiring that α=0° (recall that α is the mirror tilt angle). Similarly, the first order is blazed when β=λ/T, which dictates that √2 sin α=λ/T, or α≅λ/(√2T) where we have invoked the paraxial approximation sin α≅α. In general the "$k^{th}$" on-diagonal order is blazed when α≅kλ/(√2T)

By using the expressions described above, simplified further by replacing sin α with α (i.e. the paraxial assumption), a great deal of data can be measured by analyzing the intensity of the spots in the reflected diffraction orders. In the measurement processes described below, the mirror bias voltage will be modulated with a small AC signal, which will modulate the mirror tilt angle, α, accordingly. A typical experimental setup is quite simple, in terms of the optical configuration, and is depicted in FIGS. 1 and 1A. A laser illuminates the micromirror array, and various diffracted principal orders are detected using discretely placed PIN photodetectors.

Under weak excitation conditions (where $\Delta<<V_{bo}$), the bias voltage will take the form $V_b(t)=V_{bo}+\Delta \cos(\Omega t)$. We will generally use synchronous detection (i.e. use of a lock-in amplifier), or in the case of measuring impulse $$\tilde{A}_\phi(\phi=\phi'=\beta) \to \sum_{i=-\infty}^{\infty} \text{sinc}\left[\frac{k_dT}{\lambda}(\beta+\sqrt{2}\sin\alpha)\right]\exp\left[-\left(\frac{\pi W}{\lambda}\right)^2\left(\beta-\frac{i\lambda}{T}\right)^2\right] \text{ and}$$

$$\tilde{A}_{\phi'}(\phi'=\phi=\beta) \to \sum_{i_2=-\infty}^{\infty} \text{sinc}\left[\frac{k_dT}{\lambda}(\beta+\sqrt{2}\sin\alpha)\right]\exp\left[-\left(\frac{\pi W}{\lambda}\right)^2\left(\beta-\frac{i_2\lambda}{T}\right)^2\right].$$

(1.4)

Ultimately, the intensity of the reflected laser beam will be the most significant variable in these equations. The intensity of the reflected laser beam varies as the modulus squared of the product of the two terms above. The photodetector converts the incident light power to a voltage that is proportional to the incident intensity.

In squaring out the product of the terms in equation (1.4), we obtain both common term products (i=$i_2$) and cross-term products (i≠$i_2$), and it is easily shown that the cross-terms are insignificant. Thus we obtain, for on-diagonal terms, a much simpler expression for the light power, which takes the form:

responses we will let the digital oscilloscope average over many waveforms, such that Δ will typically be very small (e.g. on the order of a millivolt) such that the corresponding mirror tilt angle will be a linear response, assuming the form $\alpha(t)=\alpha_o+\Delta' \cos(\Omega t+\gamma)$, where γ is the magnitude of the angular peturbations on the mirror response, and γ is the phase lag in mirror tilt response to the excitation signal. Note that Δ' will typically vary with frequency (e.g. we can typically measure a strong hinge resonance, i.e. Δ' will peak out at some frequency). Now substituting $\alpha(t)=\alpha_o+\Delta' \cos(\Omega t+\gamma)$ for α in equation (1.5) gives:

$$P(\beta) \propto |\tilde{A}_\beta(\beta)|^2 \propto \sum_{k=-\infty}^{\infty} \text{sinc}^4\left[\frac{k_dT}{\lambda}(\beta+\sqrt{2}\sin\alpha)\right]\exp\left[-2\left(\frac{\pi W}{\lambda}\right)^2\left(\beta-\frac{k\lambda}{T}\right)^2\right].$$

(1.5)

$$P(\beta, t) \propto \sum_{k=-\infty}^{\infty} \text{sinc}^4\left[\frac{k_d T}{\lambda}(\beta + \sqrt{2}\,[\alpha_o + \Delta'\cos(\Omega t + \gamma)])\right]\exp\left[-2\left(\frac{\pi W}{\lambda}\right)^2\left(\beta - \frac{k\lambda}{T}\right)^2\right].$$ (1.6)

A photodetector can be placed on a particular order, which will detect all of the light impinging on that particular order. In this case the photodetector signal current generated by a detector placed on the $k^{th}$ (on-diagonal order, where k=m=n) is proportional to the incident light power, and will be given by:

$$i_d(t) \propto \text{sinc}^4\left[\frac{k_d T}{\lambda}\left(\frac{k\lambda}{T} + \sqrt{2}\,[\alpha_o + \Delta'\cos(\Omega t + \gamma)]\right)\right].$$ (1.7)

The nonlinearity inherent in the profile of the sinc$^4$ term will naturally cause the detector current to contain a mixture of DC, a fundamental signal component at temporal frequency $\Omega$, as well as harmonics of this signal (2$\Omega$, 3$\Omega$ etc.). These signal terms can be found by expanding the sinc$^4$ term out in a Taylor series expansion (with respect to $\alpha$, centered at $\alpha=\alpha_o$).

$$i_d(t) = i_o + C_1(\alpha-\alpha_o) + C_2(\alpha-\alpha_o)^2 + C_n(\alpha-\alpha_o)^n + \ldots,$$

$$\text{where } C_n = \frac{1}{n!}\frac{d^n}{d\alpha^n}\text{sinc}^4\left[\frac{k_d T}{\lambda}\left(\frac{k\lambda}{T} + \sqrt{2}\,\alpha\right)\right]_{\alpha=\alpha_o}$$ (1.8)

Because the sinc$^4$ function is well behaved, and since the system will always be excited with a very small signal, it is sufficient to retain only the first few terms of the Taylor series, giving:

$$i_d(t) \cong i_o + C_1(\alpha-\alpha_o) + C_2(\alpha-\alpha_o)^2.$$ (1.9)

As before, $\alpha$ will be replaced with $\alpha_o + \Delta'\cos(\Omega t + \gamma)$, giving the following equation:

$$i_d(t) \cong i_o + C_1\Delta'\cos(\Omega t+\gamma) + C_2\Delta'^2\cos^2(\Omega t+\gamma) \cong I_o + K_1\cos(\Omega t+\gamma) + K_2\cos[2(\Omega t+\gamma)],$$ (1.10)

where the identity $\cos^2(\theta) = (\frac{1}{2})[1+\cos(2\theta)]$, and $K_1 = C_1\Delta'$, $K_2 = C_2\Delta'^2/2$, and $I_o = i_o(1+C_2\Delta'^2/2) \cong i_o$ have been utilized.

By examining equation (1.10), it is apparent that $I_o$, $K_1$ and $K_2$ are constants. These values can be varied by choice of a particular operating point (i.e. by choosing $\alpha_o$), and by increasing or decreasing excitation amplitude (which controls $\Delta'$). These constants control the relative amplitude of the DC, fundamental ($K_1$) and double frequency ($K_2$) responses.

It follows, therefore, that under reasonably small excitation (i.e. $\Delta'<<1$), the response is described very well by equation (1.10) as a weakly nonlinear (quadratic) response, and in most cases, we can also ignore the last term of equation (1.10), obtaining a linear response. The choice of operating points (i.e. choice of $\alpha_o$, the nominal tilt angle) will allow $K_2$ to vanish, to elicit a linear response, or in another special case, we can purposely make $K_1$ vanish and maximize $K_2$ by choosing another operating point. Similarly, we can generally elicit a linear response at almost any arbitrary operating point by decreasing the excitation amplitude so as to make $\Delta'$ sufficiently small (since $K_1 \propto \Delta'$, but $K_2 \propto \Delta'^2$).

Instead of deriving coefficients $C_1$, $C_2$, $K_1$ or $K_2$ in equation (1.10) in closed form, the sinc$^4$ term and it's various derivatives can be numerically plotted using a mathematical program, such as Matlab.

Figure 4:
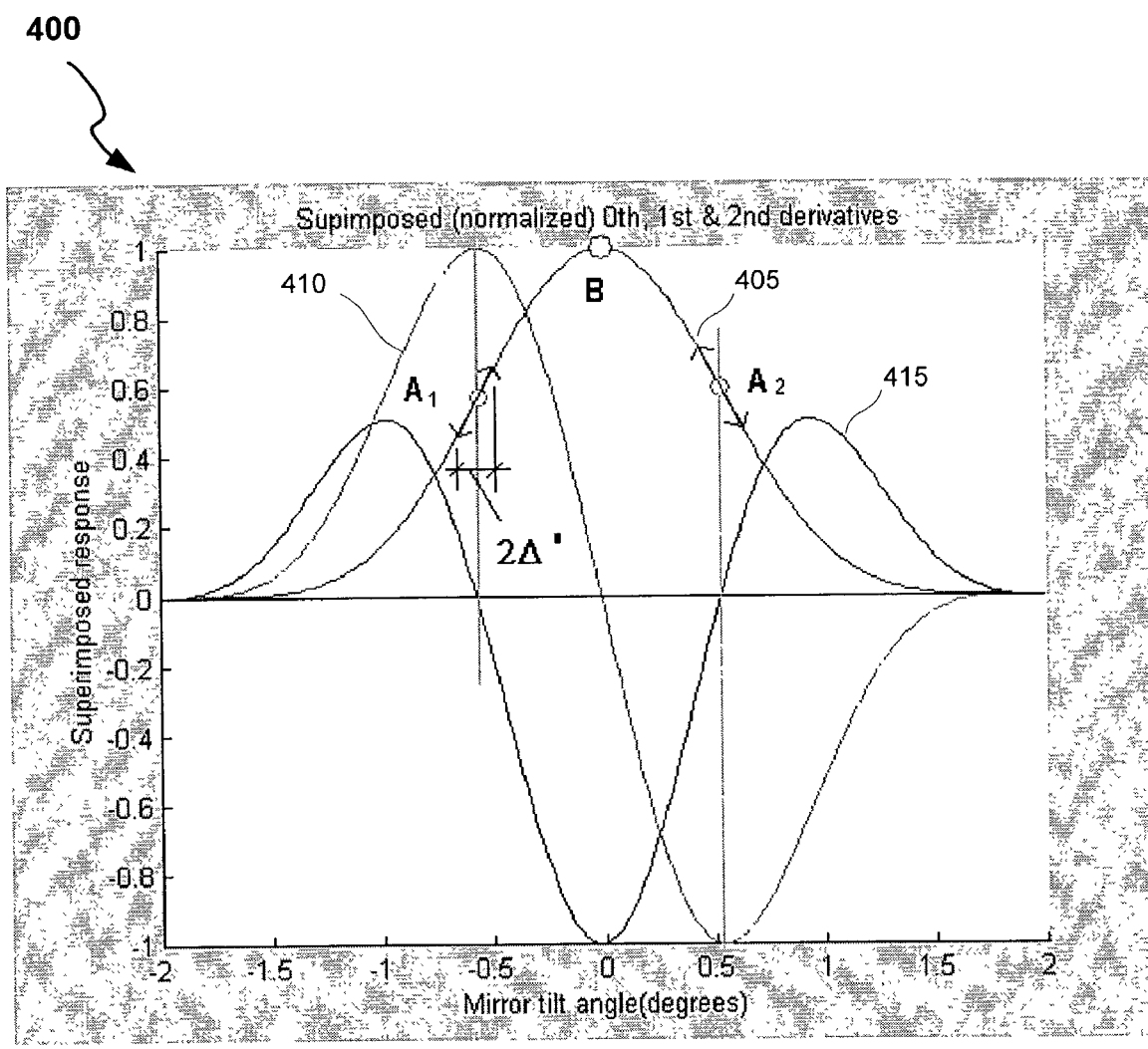
FIG. 4 is a chart depicting a representative example of the response of a micromirror array in which a photodetector 125 is located at the zeroth diffraction order.

For many temporal measurements, such as measuring the impulse response of the mirrors, it is convenient to place a PIN photodetector on an order, and adjust the DC bias (which in turn adjusts the nominal mirror tilt angle, $\alpha_o$) so as to choose an operating point (on the response curve pertaining to that order) where the 1$^{st}$ derivative is maximal and the 2$^{nd}$ derivative is minimal, such as operating points $A_1$ or $A_2$ in FIG. 4. Since points $A_1$ & $A_2$ are inflection points (i.e. the second derivative, or "curvature", goes to zero), in addition to providing maximal signal response, they also assure an optimally linear response, and finally these inflection points are also a relatively stable operating point where the linear gain (i.e. the 1$^{st}$ derivative) will not change much should the operating point drift slightly off the inflection point.

In practice, these operating points can be found by adjusting the DC bias so as to obtain a maximal response. Similar pairs of operating points exist when the photodetector is placed on other orders. A Matlab simulation shows that these points lie off to the sides of the diffraction order at about ±28% of the inter-order spacing. Using the paraxial approximation, the "$k^{th}$" order is located at a diffraction angle of $\beta_k \cong k\sqrt{2}\lambda/T$, where T is the mirror pitch, and $\beta$ is in radians. Thus, by placing the photodetector on the $k^{th}$ order, one first adjusts the DC bias to obtain a maximal response. There are two maximal response bias points (i.e. points $A_1$ or $A_2$ in FIG. 4), and these correspond to diffraction angles of $\delta = (k\pm 0.28)\sqrt{2}\lambda/T$ radians. The mirror tilt angle corresponding to these operating points is half of this value: $\alpha = (k\pm 0.28)\lambda/\sqrt{2}\,T$ radians.

It should be noted that certain parameters (with the exception of the damped impulse response) can also be measured with the orders fully blazed, by operating at point B in FIG. 4.

This will allow us to measure at operating points pertaining to $\alpha_o = k\lambda/\sqrt{2}T$, k=0,±1, ±2, ... etc. Finally, although the inflection points at $A_1$ & $A_2$ provide maximal linear response and optimally stable operating points, we are free to operate at any other operating point we desire, although we no longer may have maximum gain, optimal operating point stability, and optimal response linearity. Moreover, in the derivation of Eqn. (1.3) it was assumed that the DMD mirrors to have rectangular profiles, leading to a "sinc" profile in the optical far-field. The technique easily applies to other (nonrectangular) mirror shapes as well, however, as well as for mirrors that are not perfectly planar.

The Measurement System

A representative example of an improved measurement system 100 suitable for use with the disclosed invention is depicted in FIG. 1. In FIG. 1, a coherent light source 105, such as a laser, generates a beam of coherent light 115 that is directed towards the surface of a micromirror array 110. The micromirror array 110 reflects the beam of light 115 and generates a set of reflected light beams 117. These reflected light beams 117 are directed to a reflection screen 120.

Because the micromirror array 110 is comprised of a periodic array of micromirrors, the reflected light beams 117 form a periodic diffraction pattern of discrete spots (or "diffraction orders") on the reflection screen 120. An example of a typical diffraction pattern generated by a micromirror array 110 is depicted in FIG. 2.

Figure 2:
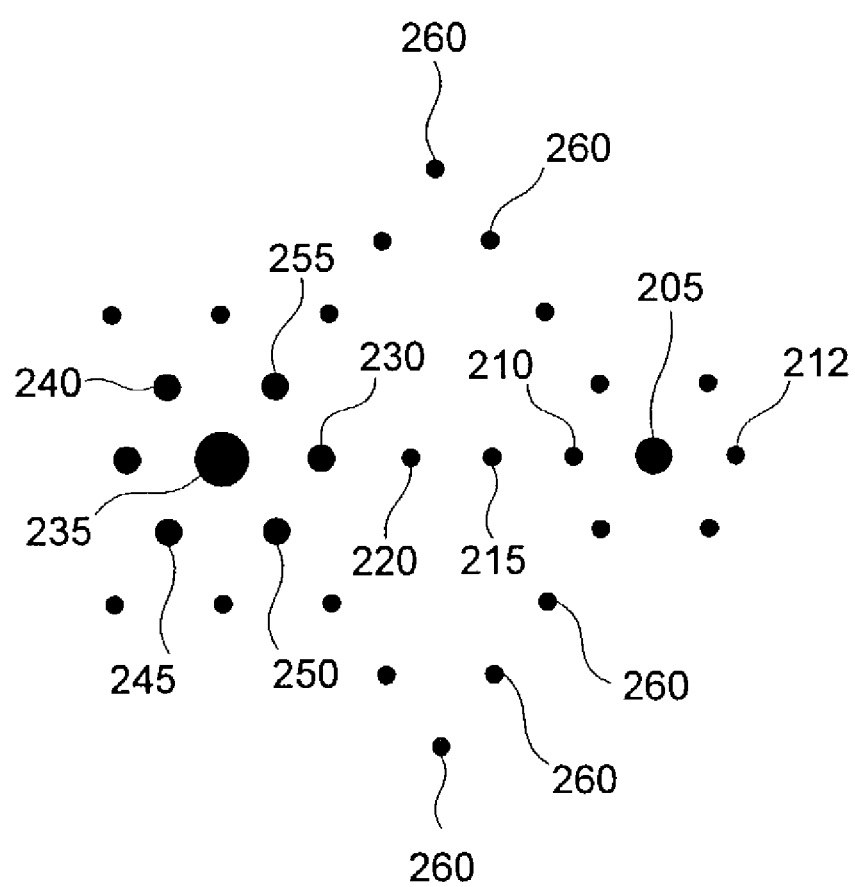
FIG. 2 is a diffraction pattern that is created by a micromirror array in which all of the mirrors have been placed at the same tilt angle and which has been illuminated with a coherent light source.

In FIG. 2, a series of spots 200 are depicted in a pattern corresponding to the diffraction pattern generated by the micromirror array 125. The pattern includes a first spot 205 corresponding to a beam of light that was reflected from the surface of the micromirror array 110 at an angle equal to the angle of incidence of the incoming light beam 115. Accordingly, the first spot 205 corresponds to a "zeroth order" diffraction point. Also depicted in FIG. 2 are a series of spots, 210, 215, 220, 230 and 235, that are arranged on a line that passes through the first spot 205. Each of the spots 210–235 corresponds to increasing diffraction orders, respectively. For example, spot 210 corresponds to a first diffraction order, spot 215 corresponds to a second diffraction order, etc. Furthermore, each of these spots 210–235 are angularly separated by intervals of approximately $\lambda/T$, where $\lambda$ is the wavelength of the light beam 110 and T is the mirror pitch/spacing. A plurality of other spots 260 corresponding to the diffraction pattern are also depicted in FIG. 2. As the mirrors of the micromirror array 110 of FIG. 1 are tilted to different angles, the relative intensity (but not the position) of these spots change. Indeed, in FIG. 2, spot 235 is depicted as having a greater intensity than the other spots. Similarly, spots 240–255 are depicted as having greater intensity than most of the other spots.

One or more photodetectors 125 may be placed in the plane of the reflection screen 120 so that they can measure the intensity of the light reflected from the micromirror array. Preferably, each of these photodetectors 125 is aligned with a spot of light corresponding to a respective diffraction order in the diffraction pattern. For example, using the arrangement depicted in FIG. 1, a photodetector 125 may be aligned with a spot of light 210 corresponding to the first diffraction order in the diffraction pattern. Similarly, a second photodetector 125 may be aligned with a spot 212 located on the other side of spot 205 that also corresponds to the first diffraction order. By aligning the photodetectors 125 with the spots corresponding to the diffraction orders, the intensity of light hitting these spots can be measured with a great deal of accuracy.

Figure 3:
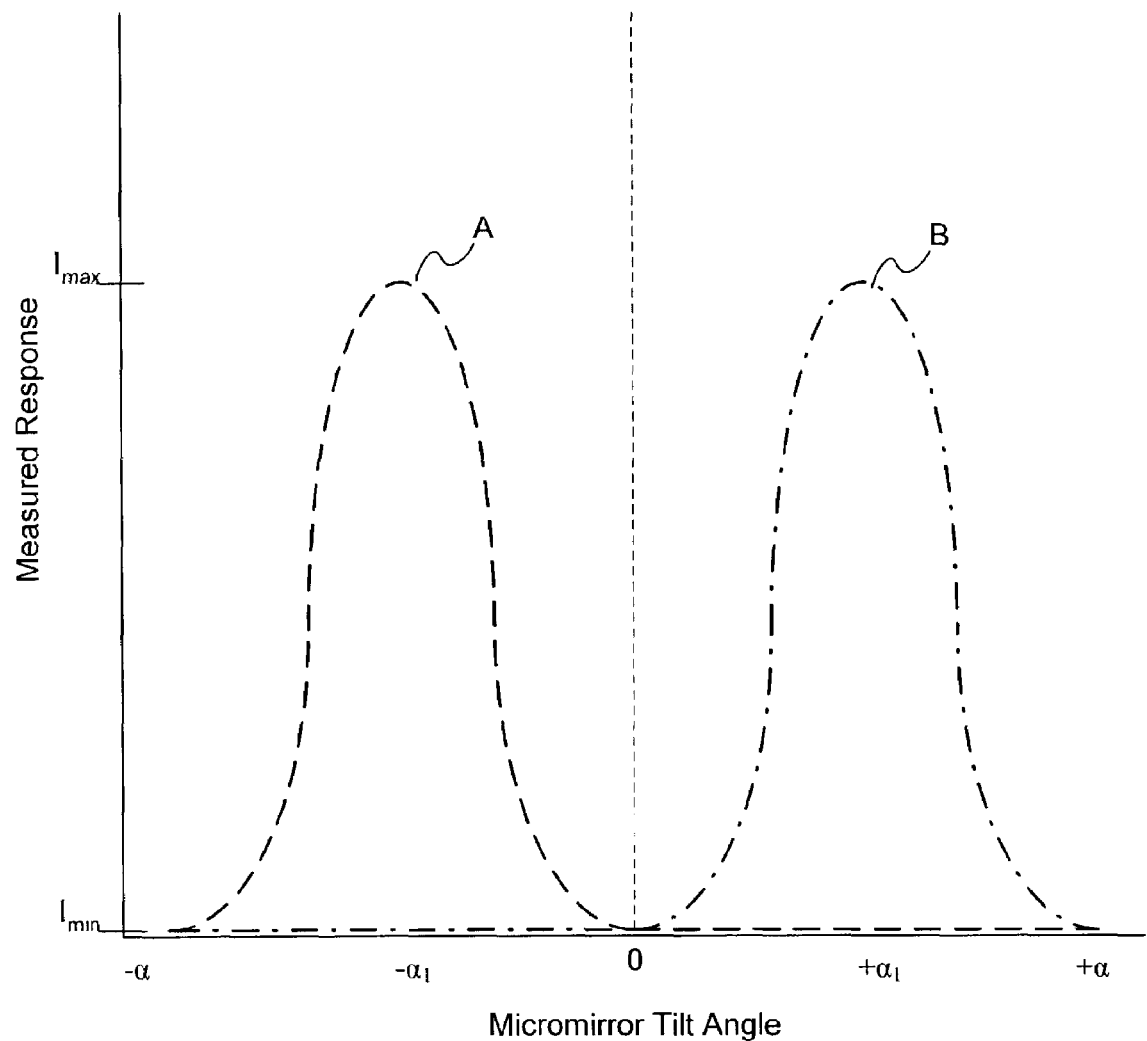
FIG. 3 is a chart depicting a representative example of the response of a micromirror array when two photodetectors are disposed at corresponding diffraction orders and the micromirrors are swept across a variety of tilt angles.

FIG. 3 is a diagram depicting the amount of light measured at each of the photodetectors 125 in the arrangement described above as the mirrors in the micromirror array are swept from one parked position to another. Initially, as the mirrors are parked at angle $-\alpha$, both photodetectors register a minimum amount of light $I_{min}$. As the mirrors are swept through angle $-\alpha_1$, however, the amount of light measured at one of the photodetectors (A) rises to level $I_{max}$. This corresponds to the rising intensity of the light as the tilt angle of the mirrors changes. After passing through angle $-\alpha_1$, the intensity of light measured at photodetector (A) falls level $I_{min}$. Similarly, as the mirrors are swept through angle 0 and $+\alpha_1$, the amount of light measured at the other photodetector (B) rises to level $I_{max}$. This corresponds to the rising intensity of the light as the tilt angle of the mirrors changes. After passing through angle $+\alpha_1$, the intensity of light measured at photodetector (B) falls back to level $I_{min}$.

FIG. 4 is a depiction of a chart 400 demonstrating the response of a micromirror array in which a photodetector 125 is located at the zeroth diffraction order. In FIG. 4, a first response curve 405 is depicted that corresponds to the intensity of light at the zeroth diffraction order as the micromirrors in the micromirror array 110 are swept from a angle of −2 degrees to +2 degrees. The first response curve 405 appropriately has a peak that occurs when the micromirror tilt angle is at zero. In FIG. 4, $2\Delta'$ is the peak to peak excursion about point $A_1$. A second response curve 410 is depicted in FIG. 4 that represents the derivative of the first response curve 405. As would be expected, the second response curve 410 has a peak and a minimum where the slope of the first response curve is greatest; namely, points $A_1$ and $A_2$. A third response curve 415 is also depicted in FIG. 4 that represents the second derivative of the first response curve 405.

A system for applying driving signals to the micromirror array 110 and measuring the amount of light reflected by the micromirror array 110 is further depicted in FIG. 1. In FIG. 1, the photodetectors 125 produce signals corresponding to the intensity of light at their respective locations on the reflection screen 120. These signals are fed into the digital scope 130, where they may be displayed and measured. In a preferred embodiment, the digital scope comprises a digital oscilloscope with display measurement capabilities. Also depicted in FIG. 1 is a function generator 135 that can produce a variety of driving signals including, for example, sinusoidal wave forms, step function wave forms, impulse function wave forms, or saw-tooth patterns. The output of the function generator is fed into a signal summer 142. The function generator 135 can also provide a sync line 165 to the digital scope 130 so that the operations of the function generator 135 can be synchronized with the operations of the digital scope 130. A DC power supply 145 can be used to provide a DC bias signal to the signal summer 142 so that the driving signal generated by the function generator 135 is offset at a particular bias point. After these signals have been combined by the signal summer 142, they are provided to the micromirror array 110 where they function as a micromirror diving signal. The output of the signal summer 142 can also be provided to a personal computer (PC) 160 for other measurements. The PC 160 can also be connected to the digital scope 130 for additional measurements. By monitoring the signal that is provided to the micromirror array 110 and by monitoring the measurements performed by the digital scope 130, the PC can measure a variety of the performance characteristics of the micromirror array 110.

An alternative embodiment of the temporal measurement system is depicted in FIG. 1A. Much like the embodiment depicted in FIG. 1, the alternative embodiment includes a coherent light source 105, a micromirror array 110, a reflector screen 120, at least one photodetector 125, a digital scope 130, a function generator 135, a DC power supply 145, and a PC 160. Also depicted in FIG. 1A, however, are a bias tee 140, a reset line break out circuit 150, a UDE board and voltage board electronics 155, a dual phase lock-in amplifier 170, and several additional connections between these components. The bias tee 140 combines the signal of the function generator 135 and/or the dual phase lock-in amplifier 170 with the bias voltage provided by the DC power supply 145 to provide a driving signal for the micromirror array 110. The reset line breakout circuit 150 is used to allow various measurements to be conducted on the driving signals that are to be provided to the micromirror array 110. The dual phase lock-in amplifier 170 performs several functions, foremost of these is to provide a periodic signal that can be swept across a variety of frequencies. The dual phase lock-in amplifier 170 can also measure the phase differential between its driving signal and the measured response of the micromirror array. The dual phase lock-in amplifier 170 can be connected to a PC 160 so that its measurements and calculations can be stored and analyzed. The UDE (i.e. Universal Drive Electronics) Board/Voltage Board Electronics are part of the support electronics used to initialize the underlying CMOS to either "ALL ON" or and "ALL OFF" state. Because the CMOS memory in the DMD array normally would power up to an unknown state, the UDE Board is used to write all DMD mirrors to identical states (i.e. either "ALL ON" or "ALL OFF"), so that when the mirror/yokes are driven by the Vbias/reset signal, all mirrors will tilt in unison.

Measuring Impulse Response

The temporal measurement system depicted in FIGS. 1 and 1A can be used to measure the impulse response of the micromirrors and the micromirror array. The function generator 135 provides the impulse driving signal to the micromirror array. The impulse signal can be delivered as a periodic function with a period of sufficient lengths to allow the micromirrors to settle after being driven with an impulse signal. According to another embodiment, however, the impulse signal need not be in the form of a periodic wave, but may instead constitute a single impulse signal. As the impulse signal is provided by the function generator 135, a DC bias can be provided by the DC power supply 145 so that the periodic impulse signal is offset to a desired DC bias level. According to a preferred embodiment, the DC bias signal is adjusted until a peak response is measured by the photodetectors 125.

Figure 5:
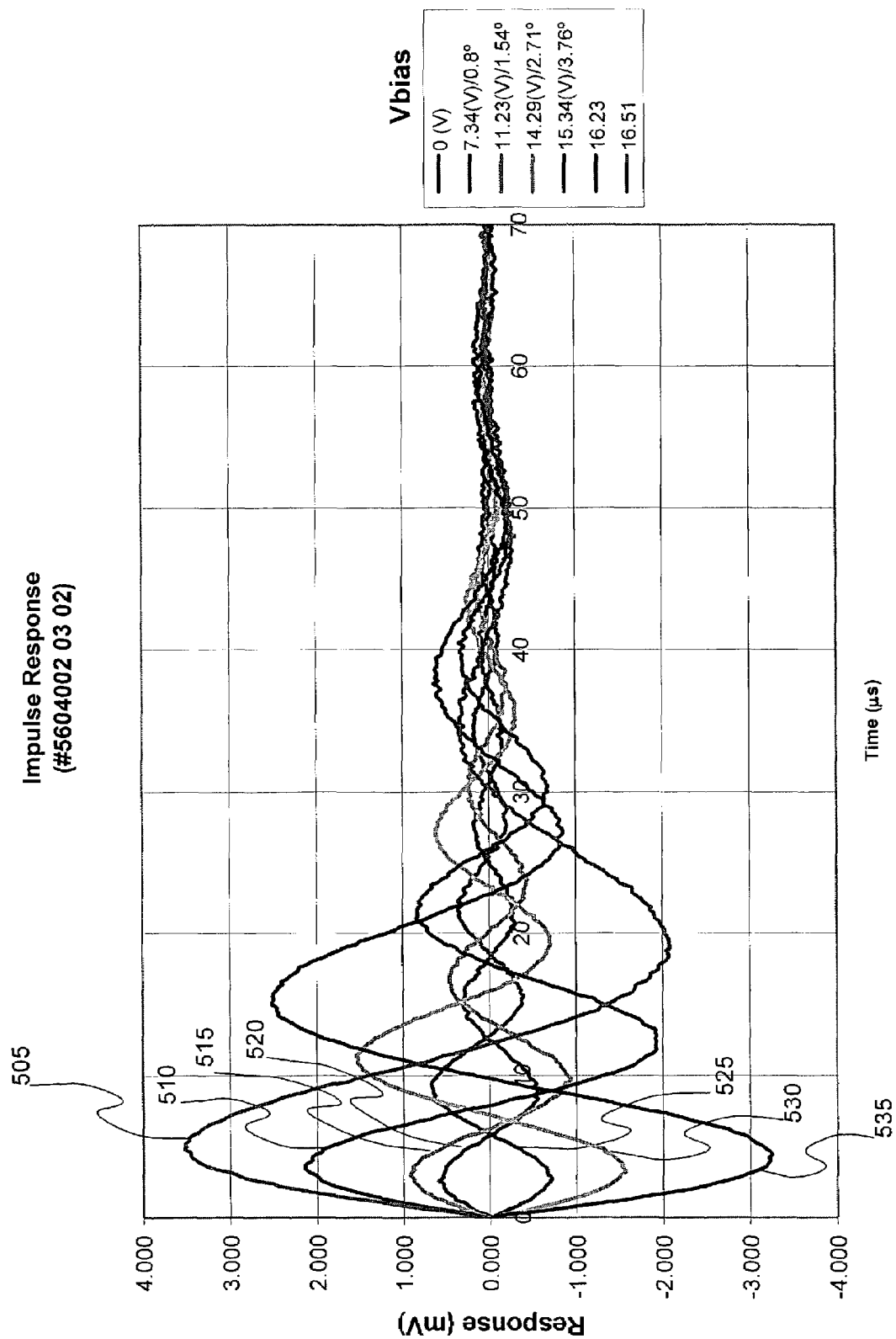
FIG. 5 is a chart depicting a representative example of the response of a micromirror array to an impulse driving signal.

According to one embodiment, a single photodetector 125 is disposed in the plane of the reflector screen 120 so that it is aligned with the zeroth order of the diffraction pattern. By aligning the photodetector 125 with the zeroth order, the measurements are performed closest to the micromirror's resting state. An impulse driving signal, which can be periodic, is applied to the micromirror array 110. The response of the micromirror array 110 as measured by photodetector 125 is displayed on the digital scope 130. According to one embodiment, the function generator 135 will generate very narrow pulses (t~0.3 microseconds), which is much smaller than the time constant of the mirrors. Thus, for purposes of measuring the impulse response, a very narrow pulse provides an acceptable imitation of an ideal pulse signal. A chart depicting the measured response of the micromirrors to an impulse signal is depicted in FIG. 5. In FIG. 5, the response of the micromirror array 110 to an impulse signal with no applied bias is represented by the curve 505. One advantage of the disclosed apparatus in method is the ability to measure the impulse response at a variety of operating points or tilt angles by adjusting the bias voltage of the DC power supply 145. This concept is depicted in FIG. 5 as several other curves (510, 515, 520, 525, 530, and 535), which depict the response of the micromirror array 110 to an impulse signal as the micromirror array is biased with the variety of voltages.

Theoretical models of the impulse response of micromirrors predict that the damped oscillation frequency will decrease as the nominal tilt angle increases. The impulse response curves depicted in FIG. 5 correspond to this theory prediction. Specifically, in FIG. 5, the frequency of the impulse response when the micromirror array is held with zero bias (line 520) is much greater than the frequency of the impulse response when the micromirror array 110 is biased with a large voltage (line 505).

Measuring Forced Resonant Frequency

As described previously, the natural frequency ($f_n$) is a parameter of interest when characterizing the temporal response of a micromirror array 110. Indeed, the natural frequency ($f_n$) can be related to the torsional spring constant K and the moment of inertia ($\Phi$) through the following equation:

$$f_n = \frac{1}{2\pi}\sqrt{\frac{k_\tau}{\Phi}}$$

The optical and electrical set-ups used for measuring forced resonant frequency (i.e., the natural frequency $f_n$) are the same as that used for measuring the impulse response. The process begins by sending either an "all-on" or an "all-off" pattern to the micromirror array 110 and placing a photodetector at the zeroth order. It is contemplated, however, that one or more photodetectors 125 may be aligned with orders other than zero, such as, for example, at the first diffraction order. Next, the function generator 135 provides a periodic wave form (typically a sinusoidal wave form) through the signal summer 142 to the micromirror array. After this, the DC bias applied to the micromirror array can be adjusted so that the largest amplitude response appears on the digital scope 130. In many instances, this will correspond to the position where the slope of the response curve is greatest, i.e. operating points A1 or A2 depicted in FIG. 4. At this point, measurements of the forced frequency response can be taken. This is performed by measuring the intensity of light striking the photodetector 125 as the frequency of the driving signal is swept throughout a desired range. The frequency at which the amplitude of the reflected light is greatest is recorded as the natural frequency ($f_n$) of the micromirrors in the micromirror array 110.

Figure 6:
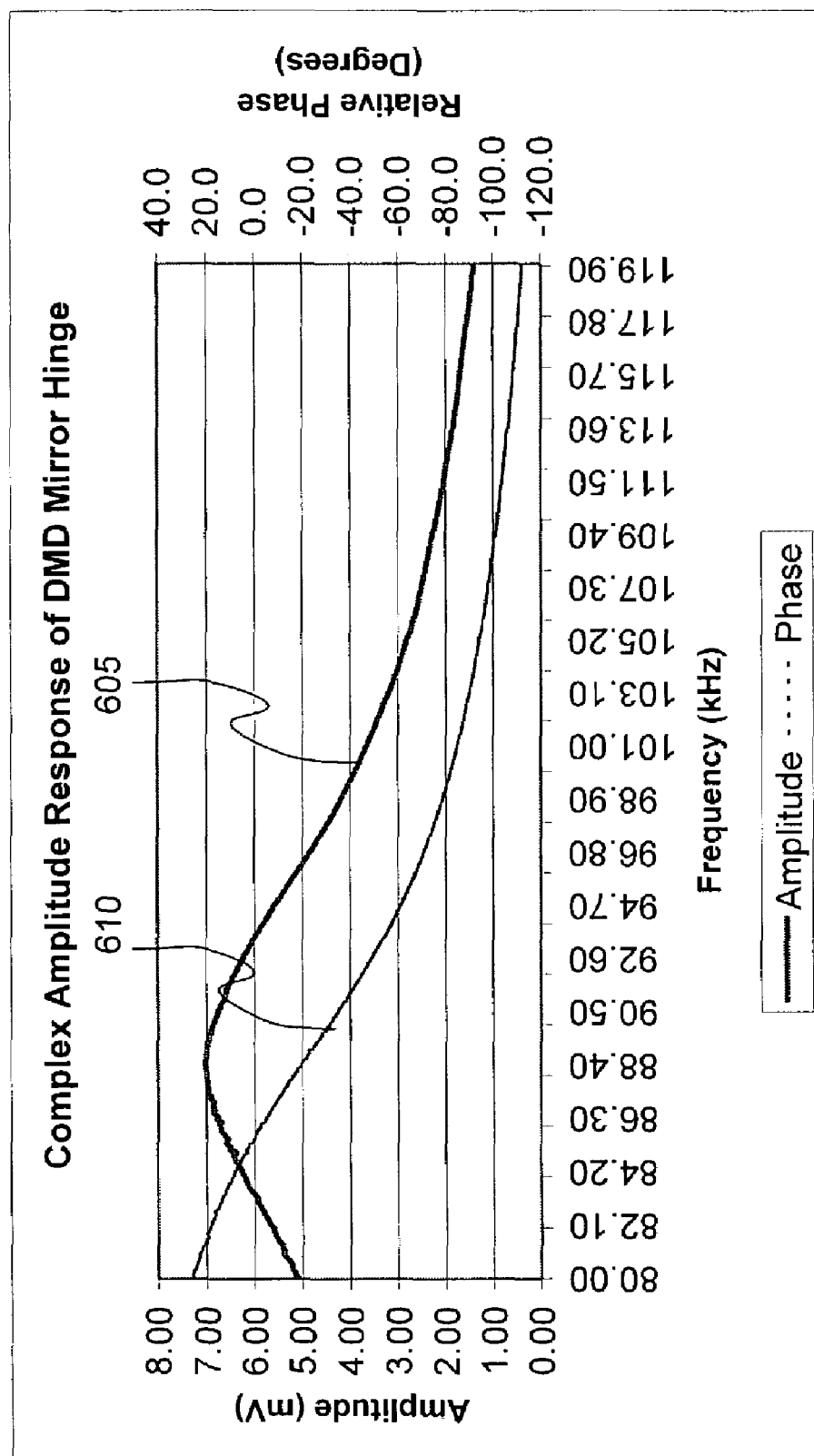
FIG. 6 is a chart depicting a representative example of the frequency response of a micromirror array subjected to a periodic driving signal.

A chart depicting these forced resonant frequency measurements is depicted in FIG. 6. In FIG. 6, a curve 605 corresponds to the measured intensity of light at the photodetector 125 at a given frequency. In FIG. 6, the measured response curve 605 peaks at approximately 89 kilohertz. Accordingly, the natural frequency of the mirrors in the micromirror array 110 will typically correspond to 89 kilohertz, which is typical for micromirror arrays of this type. Also depicted in FIG. 6 is a curve corresponding to the relative phase shift induced by the application of the periodic driving signal to the micromirror array 110. Measurements of the relative phase shift are described in further detail below.

The technique described above can also be applied to landed mirrors. With the mirrors of the micromirror array 110 landed, a photodetector 125 will typically be placed on a diffraction order that is closest to the blaze point (i.e., the diffraction order that is most strongly illuminated when the mirrors are landed). Much like the previously described process, the frequency is swept over a predetermined range until the amplitude of the measured intensity of light peaks. This measurement of landed micromirror response provides a measure of the spring tip resonance of the micromirror devices.

Other useful measurements that can be derived from the forced resonant frequency method are the half-power points of the frequency response. The half-power points correspond to frequencies ($f_1$ and $f_2$) at which the measured AC intensity fluctuation of the reflected light is equal to $1/\sqrt{2}$ the AC intensity fluctuation of light at the natural frequency. The difference between these two half-power points ($f_1$ and $f_2$) is also known as the bandwidth of the system. The bandwidth of the system can be determined by simply measuring the difference between the two half-power points. On the other hand, the quality factor (Q) is determined by dividing the natural frequency by the bandwidth of the system. Furthermore, in a simple second order system, the damping factor ξ is approximately equal to ½Q, which is also equal to $(f_2-f_1)/2f_n$. By calculating the damping factor ξ, the "damped" resonant frequency ($f_d$) may be estimated by using the following equation.

$$f_d = f_n\sqrt{1-\xi^2}$$

One advantage of measuring the forced response (as opposed to measuring the transient impulse/damped response as described above) is that these measurements provide very good signal-to-noise ratio. It should be further noted that these measurements can be performed with the system depicted in FIG. 1A, including using the lock-in amplifier to generate the frequency swept signal and measure the phase of the response (see FIG. 6).

Measuring the Frequency Transfer Function

The response measurement system depicted in FIGS. 1 and 1A can also be used to measure the frequency transfer function corresponding to the micromirror array 110. According to the embodiment depicted in FIG. 1, a function generator 135 provides a periodic sinusoidal driving function to drive the micromirror array 110. According to the embodiment disclosed in FIG. 1A, the dual phase lock-in amplifier 170 provides the periodic sinusoidal driving signal. The mirrors in the micromirror array 110 are written to either an "all-on" or "all-off" pattern and the photodetector will be placed at the spot corresponding to the zeroth order. After this, the DC bias to be applied to the micromirror array 110 by the DC power supply 145, is adjusted so that the amplitude of the spot intensity is at its greatest. As described previously, this often corresponds to operating points $A_1$ or $A_2$ depicted in FIG. 4. It is contemplated, however, that other arrangements of the system are suitable for measuring the frequency transfer function. For example, one or more photodetectors 125 may be placed on the first, second, or third order, etc. and the DC bias applied by the DC power supply 145 can be greatly varied. According to the embodiment depicted in FIG. 1A, the dual phase lock-in amplifier 170 sweeps the frequency across a desired range. According to one embodiment, the frequency sweeping function performed by the dual phase lock-in amplifier 170 can be controlled by a visual basic application running on the PC 160, which sends control signals through the RS232 line to the dual phase lock-in amplifier 170. In addition, the lock-in amplifier 170 may use the frequency sweeping output as an internal reference for "sync" detection, such that the relative phase of the response measured by the photodetectors 125 can be measured. The magnitude and phase information measured by the dual phase lock-in amplifier 170, is acquired by the PC 160 and the data may be plotted as shown in FIG. 6. As stated previously, curve 605 corresponds to the AC intensity fluctuation of the light measured by the photodetector 125 and the curve 610 corresponds to the relative phase of the signal. By using the data measured by the system, the half-power points ($f_1$ and $f_2$), the natural frequency $f_n$, the quality factor (Q), the damping factor (ξ), and the damped resonate frequency of the micromirror can be calculated. The measured data may also be used to determine the transfer function corresponding to the corresponding to the micromirror array 110.

Measuring Electromechanical Compliance

In addition to measuring steady state responses, impulse responses, and the frequency transfer function, the disclosed method and system can also measure electromechanical hinge compliance. This measurement must be distinguished from actual mechanical hinge spring compliance, which is typically measured in degrees tilt per Newton-meter of applied mechanical torque. Instead, electromechanical hinge compliance is measured in units of degrees tilt per applied volt of AC excitation. Actual mechanical hinge spring compliance is much more difficult to accurately measure because of variations in the hinge spacer thickness and hinge sag. Other factors resulting in measurement inaccuracies are a variation in electrostatic force applied to the individual micromirror, which varies nonlinearly, approximately in proportion to the equation $1/d^2$, where d is distance between the low side of the mirror and the corresponding landing electrode. Electromechanical compliance is a direct measure of the relative amount of change in mirror tilt angle induced by a known change in applied bias voltage. Because it is a relative metric (i.e. we generally measure "relative" variation, e.g., as a function of position within the die, by spatially scanning across the area of the die), rather than a quantitative metric, its measurement is relatively straightforward.

Figure 7:
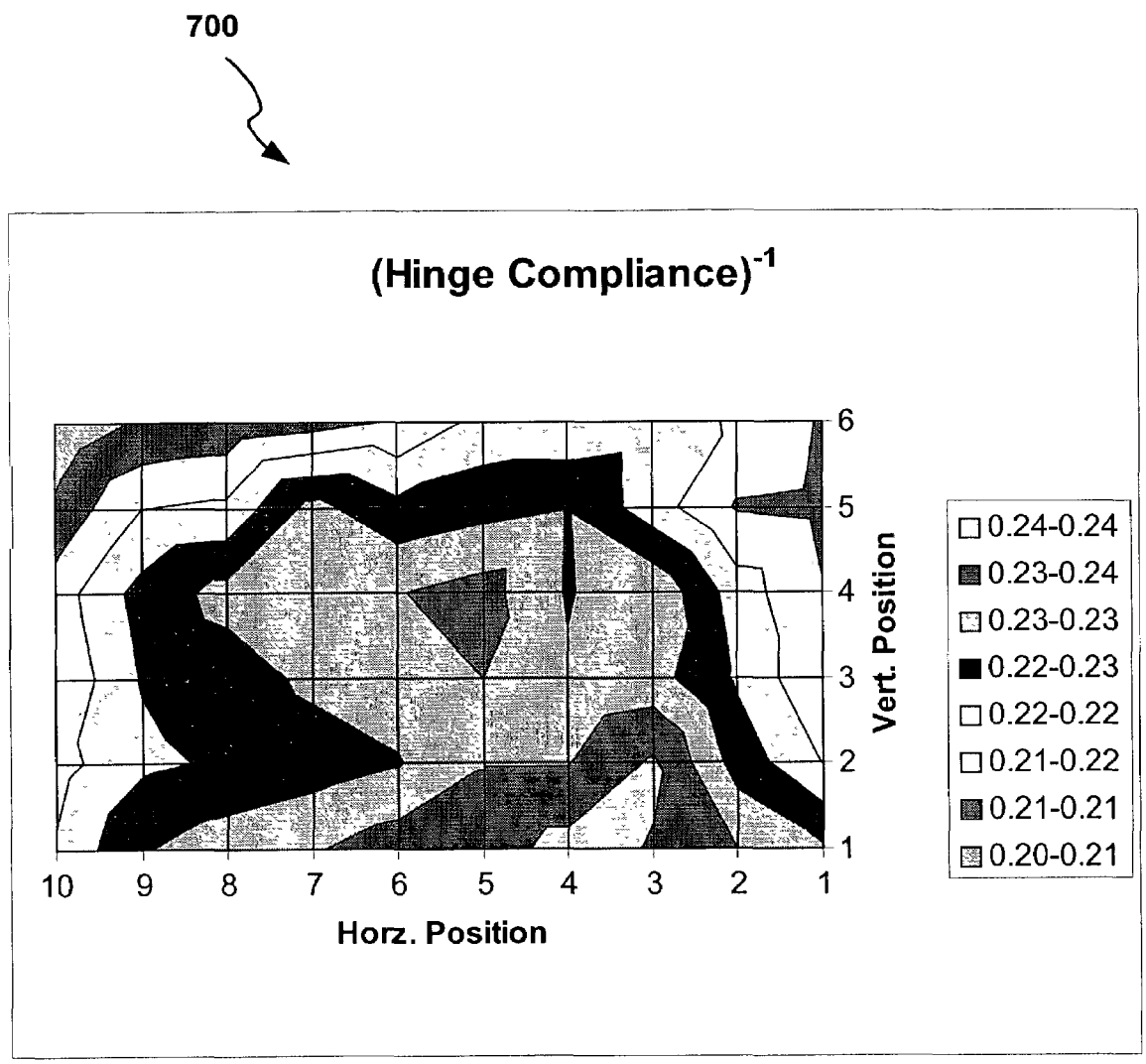
FIG. 7 is a chart depicting a representative example of a set of electromechanical compliance measurements taken over the entire surface of a micromirror array.

To measure the electromechanical compliance, either an "all-on" or an "all-off" pattern is written to the DMD array with an optical photodetector 125 placed at the zeroth order. As with the other previously described embodiments, however, these operating parameters can be varied so that one or more photodetectors 125 can be aligned with the first, second, third, etc., orders on the diffraction pattern. The function generator 135, or a dual phase lock-in amplifier 170, is used to apply a periodic sinusoidal signal to the micromirror array 110 at a frequency that is well away from the resonant frequency of the micromirror array 110. It is preferable that the frequency of the driving signal be significantly lower than the resonant frequency. As with the other prior embodiments, the DC bias applied by the DC power supply 145 is adjusted so as to find a bias point at which the amplitude of the measured response is greatest. In many cases, this bias point will correspond to operating points $A_1$ or $A_2$, which are illustrated in FIG. 4. After this, a periodic driving signal (preferably sinusoidal) is applied by the function generator 135 to the micromirror array 110 so that the photodetector(s) measure the response of the micromirrors. The amplitude of the response of the micromirror array 110 to the driving signal directly corresponds to the relative electromechanical compliance of the illuminated portion of the micromirror array 110. A motion control stage (not shown in FIGS. 1 and 1A) can be used to move the micromirror array 110 so that different portions of the micromirror array 110 can be illuminated by the coherent light source 105 and the relative electromechanical compliance can be measured. A chart 700 depicting relative electromechanical compliance measurements taken over the entire surface of a micromirror array 110 is depicted in FIG. 7.

Measurement of Micromirror Response at Non-Biased State

Another embodiment of the disclosed method and apparatus can be used to measure the response of a micromirror device 110 as the micromirrors are released from a landed position to a resting position (i.e., a non-biased state). To perform this measurement, all of the mirrors in the micromirror array 110 are landed and then released. This can be done using a simple 24 volt square wave signal. According to the embodiment disclosed in FIG. 1, the function generator 135 may provide this 24-volt square wave signal. According to another embodiment, the 24-volt square wave signal is provided by a voltage booster circuit that amplifies a much smaller (0–5 volt TTL compatible) signal into a 24-volt square wave signal. According to the preferred embodiment, however, the actual 24-volt square wave signal should accurately approximate an ideal square wave signal. During the application of the 24-volt square wave signal, all of the micromirrors in the micromirror array 110 are landed. As the square volt signal moves from 24 volts to zero, no net external field is applied to the mirrors and they are released from the landing pads. Accordingly, due to the hinge restoration torque, the mirrors travel from the landed site to the non-biased state. Upon reaching the non-biased state, the mirrors will continue to oscillate in a damped oscillatory fashion about the non-biased position. It is also possible to measure the response of the micromirrors as they are released from a landed position to another biased position, such as a tilt angle of 1, 2, 3 or 4 degrees.

In order to measure the trajectory and position of the oscillating mirrors, a system similar to the one depicted in FIG. 1 or 1A is utilized. Much like the previously described measurement processes, photodetectors 125 are placed at the light spots corresponding to the diffraction orders that are closest to the non-biased position of the micromirrors. In the case where the final resting position of the micromirrors is the flat state (i.e. where the micromirror tilt angle=0), this could correspond to placing a pair of photodetectors 125 at the first diffraction orders. In the case where the final resting position of the micromirrors is a tilt angle of several degrees, however, this could correspond to placing a pair of photodetectors 125 at the third and fourth diffraction orders. As the micromirrors are released from their landed position, the photodetectors 125 will measure the amount of light reflected by the micromirrors 110. The output response of the photodetectors 125 is displayed at the digital scope 130 and can be measured as a function of time.

Figure 8:
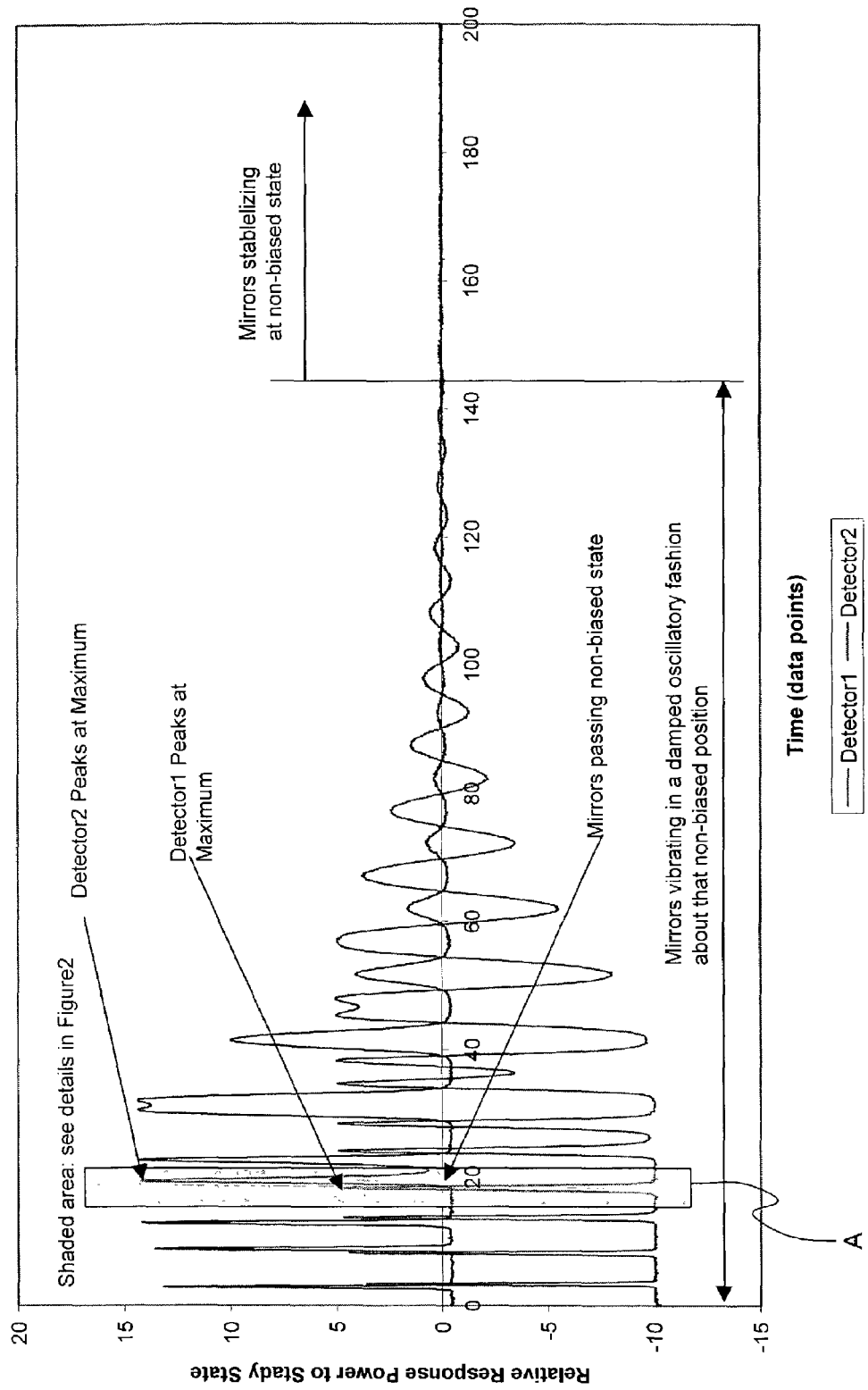
FIG. 8 is a chart depicting a representative example of the response of a micromirror array that is released from its respective landing positions.

FIG. 8 is a representative example of the response measured by a pair of photodetectors 125 as they are released from the landed position. By determining the time instance when the amount of reflected light peaks in FIG. 8, the position and velocity of the micromirrors at specific instances of time can be calculated. According to this embodiment, the acceleration of the mirrors is neglected; however, measurements of the acceleration of the mirrors can be made by analyzing this data with numeric derivatives.

Figure 9:
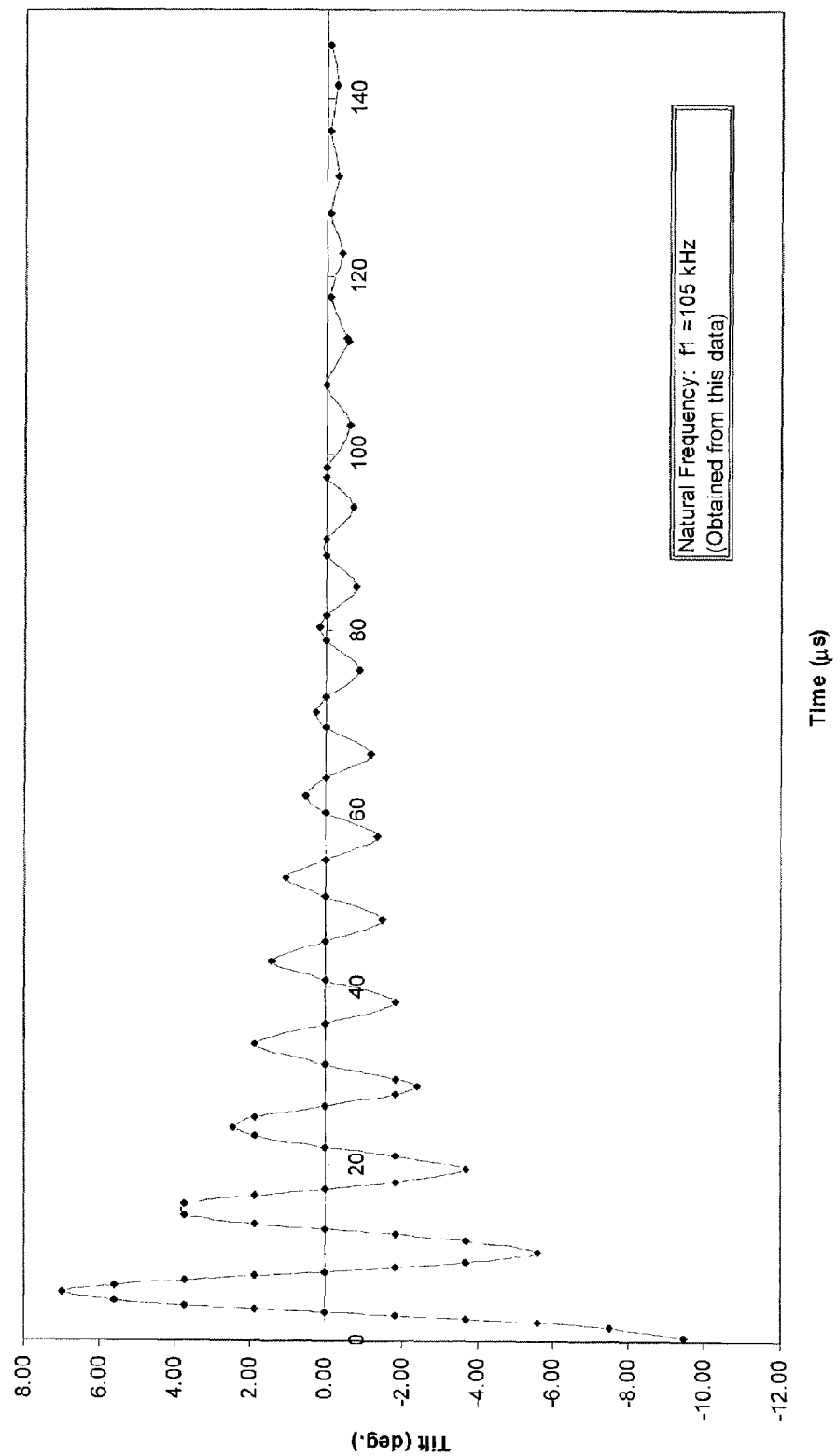
FIG. 9 is a chart depicting a representative example of the oscillation of a micromirror array after the micromirrors have been released from their respective landing positions.

Portion "A" of FIG. 8 is depicted in further detail in FIG. 8A, which depicts the response function when the micromirrors pass by the non-biased state. In FIG. 8A, one incident is illustrated where each photodetector receives a maximum response (corresponding to mirrors tilting in the detector direction) and a zero (corresponding to mirrors being at non-biased state). At time $t_1$, detector 1 indicates a maximum meaning that the micromirrors are tilted in the direction of detector 1. At time $t_2$, both detector 1 and detector 2 read zero, which indicates that the micromirrors are at the non-biased state. At time $t_3$, detector 2 reads a maximum, which indicates that that micromirrors are tilted in the direction of detector 2. The velocity of the mirrors passing by the non-biased state is calculated by performing a linear interpolation based upon these three data points. More specifically, the angular velocity ω is given by $\omega=(\alpha_2-\alpha_1)/T_1$ (°/sec), where $T_1=t_3-t_1$, $\alpha_1$ is the micromirror tilt angle corresponding to the location of detector 1, and $\alpha_2$ is the micromirror tilt angle corresponding to the location of detector 2. The non-biased tilt angle $\alpha_0$ can also be interpolated from these measurements by using the formula $\alpha_o=\alpha_1+\omega*T_2$, where $T_2=t_2-t_1$ and ω is the angular velocity of the micromirrors. By using these tilt angle measurements at different points in time, a chart of the non-biased tilt angle response of a micromirror array can be generated. A chart depicting a representative non-biased tilt angle measurement is depicted in FIG. 9.

According to another embodiment, these measurements can also be used to calculate tilt angle of the micromirror array when the mirrors are at the non-biased state. With reference to FIG. 8, the first step of this process is to normalize the response curves of each of the photodetectors to zero. After this is done, with reference to FIG. 8A, the location where the two response curves cross the "zero" line correspond to the time when the micromirrors pass the non-biased state. By using this time instance $t_2$, the measured angular velocity of the micromirrors, and time instance $t_1$, the tilt angle of the micromirrors in the micromirror array at the non-biased state can be measured with a high level of accuracy.

Measurements at the First Harmonic Response Point

According to another aspect of the disclosed invention, measurements of the response of the micromirror array can be conducted at operating point B, rather than points $A_1$ and $A_2$ (referring to FIG. 4). At operating point B, the first derivative of the response curve is zero (see curve 410 in FIG. 4) and the second derivative is maximal (see curve 415 in FIG. 4). Accordingly, a driving signal that oscillates about operating point B will excite a harmonic of the fundamental, creating a double frequency response. That is to say, if the DC bias of the measurement system is adjusted so as to lie at operating point B, and an AC sinusoidal signal with frequency $f_o$ is supplied as a driving signal, then the photodetector response will contain a strong harmonic signal with frequency $2f_o$. This provides the ability to measure micromirror response at operating points where the normal diffraction orders are now fully blazed. The fact that the response is "frequency doubled" is immaterial if we only wish to measure, e.g., the natural resonant frequency. In this case we simply: (a) adjust DC bias so that we obtain a maximal double frequency response, and the fundamental response vanishes, then (b) adjust the frequency of the function generator until the (frequency doubled) response peaks in amplitude. Then we read off the frequency from the function generator as being the resonant frequency that excited the peak response.

This method can be used to measure the forced resonant frequency of a micromirror array while its mirrors are in a mechanically "neutral" state (i.e. assuming the hinges are not "torque"). Relative electromechanical compliance can be similarly measured by "blazing" (i.e. maximally illuminating) the k=0 order, (or k=±1 etc.), and measuring the amplitude of the (frequency doubled) response. One thing to note, however, is that operating point B is a very unstable operating point. Small perturbations can easily dislocate the operating point, and not only does the gain (i.e. the magnitude of the $2^{nd}$ order derivative) change rapidly about this point, but if we move off the point we rapidly reintroduce a strong signal at the fundamental frequency (i.e. the magnitude of the $1^{st}$ derivative increases rapidly as we move off of operating point B). For this same reason, it is important to excite the system with very small driving signals when operating at point B, so as not to induce nonlinear responses that would corrupt the measurements.

This method can also be used to determine the precise amount of DC bias needed to "blaze" the k=0 order (i.e. cause the zeroth order to be maximally illuminated). This corresponds to the mirrors being in a virtually flat state. This measurement can be performed by adjusting the DC bias until we see the $1^{st}$ harmonic response peak, and simultaneously see the fundamental signal vanish. This method provides a very precise means of blazing the order, and is much more accurate that adjusting the DC bias so as to peak the amplitude of the reflected light.

Another application of this technique is to characterize torqued micromirror devices. This would allow us to determine precisely what DC bias voltage must be applied (assuming that the DMD array is written either to an "all on" or "all off" state) to cause the mirrors to go to a perfectly flat state (i.e. to blaze the k=0 order). This bias level, also known as the "flat voltage," is an indirect metric for comparing the relative torqueing of various devices.

The Mathematical Model of the Diffraction Pattern

Figure 10:
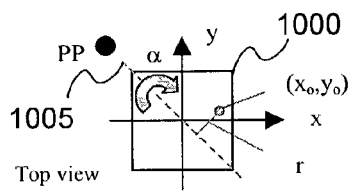
FIG. 10 is a top view of a representative micromirror according to one aspect of the invention.
Figure 10P:
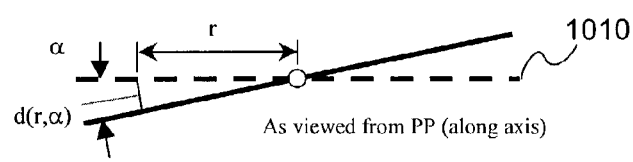
FIG. 10P is a cross-sectional view of the micromirror depicted in FIG. 10 according to another aspect of the invention.

The mathematical derivations underlying the principles of this invention are described in further detail below. The first set of derivations is based upon a single square mirror that has a hinge that runs diagonally through the mirror. A representative embodiment of this mirror is depicted in FIG. 10. In FIG. 10, a mirror 1000 is depicted with a hinge 1005 that passes diagonally through the mirror 1000. Also depicted in FIG. 10 is a set of x and y axes aligned with the mirror 1000 to identify the location of a particular spot on the mirror 1000. A cross-sectional view of mirror 1000 from point PP is depicted in FIG. 10P. In FIG. 10P, the mirror 1000 is deflected at an angle $\alpha$ from its resting position 1010. The radial position r of a point on the mirror $(x_o, y_o)$ is defined by the following formula:

$$R = X_o \cos 45° + Y_o \sin 45° = \frac{x_o + y_o}{\sqrt{2}}$$

Accordingly, the depth function $d(r, \alpha)$ of a specific point on the mirror $(x_o, y_o)$, wherein the depth of the point is measured from the resting position 1010 of the mirror, is defined by the following formula:

$$D(R, \alpha) = \frac{(X_O + Y_O)\sin\alpha}{\sqrt{2}}$$

Now for the paraxial case ($\alpha$ small) we consider plane wave illumination along the Z axis (i.e. perpendicular to the resting plane 1010 of the mirror). The "round trip" phase delay associated with a plane wave traveling an extra distance $2d(r,\alpha)$ is given by $\Delta\theta = 2k \cdot d(r,\alpha)$. In addition, the mirror geometry imposes a simple aperture function, which for the case of $\alpha=0$ is defined by the following formula:

$\Lambda(x,y) = rect(x/k_dT)rect(y/k_dT)$ wherein T is the pitch (spatial period of the mirrors), $k_d$ is the "fill factor" of the mirror, and the "rect" function is defined by:

$$rect(x) = \begin{cases} 1, & |x| < 0.5 \\ 0, & |x| > 0.5 \end{cases}.$$

For nonzero $\alpha$, the apparent aperture distorts slightly (into more of a "diamond" shape), but for tilt angles of ±12°, this distortion is relatively insignificant and will be disregarded, as will the obliquity factor.

As a result, the reflected field for a single mirror 1000 can be described by the following equation:

$$\hat{E}(x, y) = \Lambda(x, y)\exp(-j\Delta\theta)$$
$$= \hat{E}_x(x)\hat{E}_y(y)$$
$$= \left\{rect\left[\frac{x}{k_dT}\right]\exp(-j\sqrt{2}\,kx\sin\alpha)\right\}\left\{rect\left[\frac{y}{k_dT}\right]\exp(-j\sqrt{2}\,ky\sin\alpha)\right\}.$$

Because this equation is separable, an array of mirrors can be emulated by convolving this equation with a periodic "comb" function, such as the one written below:

$E(x,y) = E_x(x)E_y(y)$ where:

$$E_x(x) = \frac{1}{T}comb(x/T) * \left\{rect\left[\frac{x}{k_dT}\right]\exp(-j\sqrt{2}\,kx\sin\alpha)\right\}$$

$$E_y(y) = \frac{1}{T}comb(y/T) * \left\{rect\left[\frac{y}{k_dT}\right]\exp(-j\sqrt{2}\,ky\sin\alpha)\right\}, \text{ and}$$

where comb $$\text{where } comb(x/T) = T\sum_{n=-\infty}^{+\infty}\delta(x-nT),$$

and $\delta(x)$ is the well-known Dirac delta function.

Finally, a Gaussian equation, which describes the spatial profile of a typical gas laser beam, is utilized as follows:

$E(r) = \exp[-(r/W)^2] = \exp[-(x/W)^2]\exp[-(y/W)^2]$.

It should be noted that this equation is separable, like the functions describing the reflected field of the mirrors. Applying the Gaussian equation to the equations describing the reflected field of the mirrors produces the following equations.

$E(x,y) = E_x(x)E_y(y)$ where:

$$E_x(x) = \exp[-(x/W)^2]\left\{\frac{1}{T}comb(x/T) * \left[rect\left[\frac{x}{k_dT}\right]\exp(-j\sqrt{2}\,kx\sin\alpha)\right]\right\}$$

$$E_y(y) = \exp[-(y/W)^2]\left\{\frac{1}{T}comb(y/T) * \left[rect\left[\frac{y}{k_dT}\right]\exp(-j\sqrt{2}\,ky\sin\alpha)\right]\right\}.$$

In this equation, W is the "waist" of the illumination beam that is determined by how tightly the laser beam is focused before striking the mirror array.

The Gaussian illumination profile serves to effectively window the otherwise infinite array of mirrors. For purposes of characterizing the micromirror array, the angular plane wave spectrum generated by that array is of particular interest. This spectrum can be obtained by a simple Fourier transform, then replacing the transform variables ($f_x$, $f_y$) with (sin $\Phi/\lambda$, sin $\Phi'/\lambda$) respectively. This is made easier by the fact that E(x,y) is separable. The following Fourier Transform relations are also useful:

$$F\{\exp[-(x/W)^2]\} \to \sqrt{\pi}\, W \exp[-(\pi W f_x)^2];$$

$$F\left\{\frac{1}{T}\text{comb}(x/T)\right\} \to \text{comb}(Tf_x);$$

$$F\left\{\text{rect}\left[\frac{x}{k_d T}\right]\right\} \to k_d T \text{sinc}(k_d T f_x);\text{ and}$$

If $g(x) \to G(f_x)$, then $g(x)\exp(-j2\pi ax) \to G(f_x+a)$.

This gives $$F\left\{\text{rect}\left[\frac{x}{k_d T}\right]\exp(-j\sqrt{2}\,kx\sin\alpha)\right\} \to k_d T \text{sinc}[k_d T(f_x + \sqrt{2}\sin\alpha/\lambda)].$$

Applying these facts and using the convolution theorem gives the following equation:

$$F\{E(x)\} = \sqrt{\pi}\, W k_d T \exp[-(\pi W f_x)^2] * \left\{\text{comb}(Tf_x)\text{sinc}\left[k_d T\left(f_x + \frac{\sqrt{2}\sin\alpha}{\lambda}\right)\right]\right\}$$

Because the micromirror array is symmetrical about the X and Y axes, $F\{E(f_y)\}$ is identical to this equation, with the exception that $f_x$ is replaced with $f_y$. Accordingly, the diffraction pattern may be described by the rightmost term which is periodic, convolved with the Gaussian "point spread function." By replacing $f_x$ with $\sin\phi/\lambda$ etc., the following equation is rendered:

$$\tilde{A}(\phi,\phi') = \pi(Wk_dT)^2 X\exp[-(\pi W\sin\phi/\lambda)^2] * \left\{\text{comb}(T\sin\phi/\lambda)\text{sinc}\left[\frac{k_dT}{\lambda}(\sin\phi + \sqrt{2}\sin\alpha)\right]\right\}$$

$$X\exp[-(\pi W\sin\phi'/\lambda)^2] * \left\{\text{comb}(T\sin\phi'/\lambda)\text{sinc}\left[\frac{k_dT}{\lambda}(\sin\phi' + \sqrt{2}\sin\alpha)\right]\right\}$$

This equation can also be expressed as a periodic array of diffracted Gaussian spots, weighted by a sinc envelope where $\text{sinc}(x) \equiv \sin(\pi x)/\pi x$, as:

$$\tilde{A}(\phi,\phi') = \pi(Wk_dT)^2 \tilde{A}_\phi(\phi)\tilde{A}_{\phi'}(\phi')\text{ where:}$$

$$\tilde{A}_\phi(\phi) = \text{sinc}\left[\frac{k_dT}{\lambda}(\phi + \sqrt{2}\sin\alpha)\right]\sum_{m=-\infty}^{\infty}\exp\left[-\left(\frac{\pi W}{\lambda}\right)^2\left(\phi - \frac{m\lambda}{T}\right)^2\right]$$

$$\tilde{A}_{\phi'}(\phi') = \text{sinc}\left[\frac{k_dT}{\lambda}(\phi' + \sqrt{2}\sin\alpha)\right]\sum_{m=-\infty}^{\infty}\exp\left[-\left(\frac{\pi W}{\lambda}\right)^2\left(\phi' - \frac{n\lambda}{T}\right)^2\right].$$

In these equations, the liberty of making the paraxial approximations $\sin\phi \cong \phi$, $\sin\phi' \cong \phi'$ has been taken. In this particular embodiment, the $[\sin(x)/x]^2$ (actually described above in terms of a sinc function, although we understand that $\text{sinc}(x)=(\sin(\pi x)/\pi x)$ distribution moves in a diagonal direction as the tilt angle (a) varies (i.e. it has equal components of displacement in the $\phi$ and $\phi'$ directions), whereas in FIG. 2, the $[\sin(x)/x]^2$ distribution moves in the horizontal direction. This can be reconciled by simply applying a (45°) rotation of coordinate operation to the above equation using $$\begin{bmatrix}\phi_n\\ \phi_n'\end{bmatrix}\begin{bmatrix}\cos 45° & \sin 45°\\ -\sin 45° & \cos 45°\end{bmatrix}\begin{bmatrix}\phi\\ \phi'\end{bmatrix},$$

where $\phi_n$ now represents the horizontal axis and $\phi_n'$ the vertical axis. We refrain from carrying on this calculation here, in the interest of brevity.

Several additional observations should be made at this point. First, the sinc term creates a wide "envelope," which is centered at angle $\phi = \sqrt{2}\sin\alpha$. The period between nulls of the sinc pattern $= \lambda/(k_dT)$. Second, the comb function determines the periodicity of the diffraction pattern. The angular period is $\lambda/T$, which is nearly the same as the sinc period, particularly when $k_d$ approaches unity. This could result in "beat frequency" effects, whereby various diffraction spots will occasionally fall on the null of the $\text{sinc}^2$ distribution in a predictable manner. Third, the width of individual spots is, of course, inversely proportional to the number of mirrors illuminated—which depends on W, the waist of the incoming laser beam. Therefore, the diffracted spot size is apparently given by $S_d = 2\lambda/\pi W$.

Although certain embodiments and aspects of the present inventions have been illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof. Applicant intends that the claims shall not invoke the application of 35 U.S.C § 112, ¶6 unless the claim is explicitly written in means-plus-step or means-plus-function format.

We claim:

1. A method of measuring a response characteristic of a micromirror array, the method comprising:
   illuminating a micromirror array with a coherent light source so as to generate a reflected diffraction pattern;
   aligning a photodetector with a spot of light of the diffraction pattern, wherein the spot of light corresponds to an order of the diffraction pattern;
   applying a dc bias to the micromirror array so that an amount of light directed to the photodetector is at a maximum;

applying a periodic driving signal to the micromirror array; and measuring the intensity of the spot of light with the photodetector for a period of time after the periodic signal has been applied to the micromirror array.

2. A method according to claim 1, further comprising:

illuminating a plurality of locations on the surface of the micromirror array; and measuring the intensity of the spot of light at each of the plurality of locations.

3. A method according to claim 1, further comprising determining a transfer function associated with the micromirror array based upon measurements of the intensity of the spot of light by the photodetector.

4. A method according to claim 1, further comprising determining a frequency of the driving signal at which the amplitude of a response signal measured by the photodetector is at a maximum.

5. A method according to claim 4, further comprising identifying a set of half-power points corresponding the response signal.

6. A method according to claim 5, further comprising identifying a damping factor corresponding to the response signal.

7. A method according to claim 6, further comprising identifying a damped resonant frequency corresponding to the response signal.

8. A method of measuring an impulse response characteristic of a micromirror array, the method comprising:

illuminating a micromirror array with a coherent light source so as to generate a reflected diffraction pattern;

aligning a photodetector with a spot of light of the diffraction pattern, wherein the spot of light corresponds to an order of the diffraction pattern;

applying a dc bias to the micromirror array so that the micromirrors are disposed at an operating point so that the amplitude of an impulse response curve measured by the photodetector is at a maximum;

applying a impulse signal to the micromirror array; and measuring the intensity of the spot of light with the photodetector for a period of time after the impulse signal has been applied to the micromirror array.

9. A method according to claim 8 further comprising measuring the frequency of the response signal generated by the photodetector during the period of time after the impulse signal.

10. A method according to claim 8 further comprising measuring the amplitude of the response signal generated by the photodetector during the period of time after the impulse signal.

11. A method of measuring a forced resonant frequency characteristic of a micromirror array, the method comprising:

illuminating a micromirror array with a coherent light source so as to generate a reflected diffraction pattern;

aligning a photodetector with a spot of light of the diffraction pattern, wherein the spot of light corresponds to an order of the diffraction pattern;

applying a periodic driving signal to the micromirror array so that a periodic response signal corresponding to the fluctuating intensity of the spot of light is measured by the photodetector;

applying a DC bias to the micromirror array so that an amplitude of the response signal measured by the photodetector is at a maximum; and measuring the intensity of the spot of light with the photodetector as the frequency of the periodic driving signal is swept over a desired range.

12. A method according to claim 11, further comprising identifying a frequency of the driving signal at which the amplitude of the response signal is at a maximum.

13. A method according to claim 12, further comprising identifying a set of half-power points corresponding the response signal.

14. A method according to claim 13, further comprising identifying a damping factor corresponding to the response signal.

15. A method according to claim 14, further comprising identifying a damped resonant frequency corresponding to the response signal.

16. A method according to claim 15 wherein the measuring, sweeping and identifying operations are performed by a computer system.

17. A method of measuring an electromechanical compliance characteristic of a micromirror array, the method comprising:

illuminating a micromirror array with a coherent light source so as to generate a reflected diffraction pattern;

aligning a photodetector with a spot of light of the diffraction pattern, wherein the spot of light corresponds to an order of the diffraction pattern;

applying a periodic driving signal to the micromirror array so that a response signal corresponding to the intensity of the spot of light is measured by the photodetector;

applying a DC bias to the micromirror array so that an amplitude of the response signal measured by the photodetector is at a maximum;

measuring the amplitude of the response signal; and determining a relative electromechanical compliance value corresponding to the ratio of an amplitude of the driving signal to the amplitude of the response signal.

18. A method according to claim 17, further comprising:

illuminating a plurality of locations on the surface of the micromirror array; and measuring the relative electromechanical compliance at each of the plurality of locations.

19. A method of measuring a non-biased response characteristic of a micromirror array, the method comprising:

illuminating a micromirror array with a coherent light source so as to generate a reflected diffraction pattern;

aligning a first photodetector with a first spot of light of the diffraction pattern corresponding to an order of the diffraction pattern;

applying a first dc bias to the micromirror array so that an amplitude of a response signal measured by the first photodetector is at a maximum;

applying a second dc bias to the micromirror array so that the micromirrors in the micromirror array are landed;

releasing the micromirrors in the micromirror array from the landed position by removing the second dc bias; and measuring the intensity of the first spot of light with the first photodetector for a first period of time after the micromirrors have been released from the landed position.

20. A method according to claim 19, further comprising:

aligning a second photodetector with a second spot of light of the diffraction pattern corresponding to an order of the diffraction pattern; and measuring the intensity of the second spot of light with the second photodetector for the first period of time.

21. A method according to claim 20, further comprising:
normalizing response curves corresponding to the measured intensity of the first and second spots of light, respectively, so that a final steady state response corresponds to zero; and
determining a non-biased tilt angle of the micromirror array by analyzing when the response curves are at zero.

22. A system adapted to measure the temporal response characteristics of a micromirror array, the system comprising:
a function generator adapted to provide a driving signal and a sync signal;
a dc power supply adapted to provide a bias voltage;
a signal summer adapted combine the driving signal with the bias voltage and provide a combined signal to the micromirror array;
a coherent light source adapted to illuminate the micromirror array with a coherent light beam so as to generate a reflected diffraction pattern;
at least one photodetector aligned with a spot of light of the diffraction pattern that corresponds to an order of the diffraction pattern; and
a scope adapted to receive the response signal from the at least one photodetector and adapted to receive the sync signal from the function generator.

23. A system according to claim 22, further comprising:
a dual phase lock-in amplifier adapted to provide a periodic signal at a frequency that can be swept through a desired range; and
a computer adapted to control the operations of the dual phase lock-in amplifier and monitor the response signal from the at least one photodetector.

* * * * *